(12) United States Patent
Koren et al.

(10) Patent No.: US 10,509,846 B2
(45) Date of Patent: Dec. 17, 2019

(54) ACCELERATOR FOR PROCESSING DATA

(71) Applicant: Intel Corporation, Santa Clara, CA (US)

(72) Inventors: Chen Koren, Hadera (IL); Dan Baum, Haifa (IL)

(73) Assignee: Intel Corporation, Santa Clara, CA (US)

( * ) Notice: Subject to any disclaimer, the term of this patent is extended or adjusted under 35 U.S.C. 154(b) by 57 days.

(21) Appl. No.: 15/840,552

(22) Filed: Dec. 13, 2017

(65) Prior Publication Data

US 2019/0042538 A1    Feb. 7, 2019

(51) Int. Cl.
| | |
|---|---|
| *G06F 17/16* | (2006.01) |
| *G06F 7/544* | (2006.01) |
| *G06F 7/523* | (2006.01) |
| *G06N 3/04* | (2006.01) |
| *G06N 3/063* | (2006.01) |
| *G06N 3/08* | (2006.01) |
| *G06F 9/30* | (2018.01) |
| *G06N 3/02* | (2006.01) |

(52) U.S. Cl.
CPC ............... *G06F 17/16* (2013.01); *G06F 7/523* (2013.01); *G06F 7/5443* (2013.01); *G06N 3/04* (2013.01); *G06N 3/063* (2013.01); *G06N 3/08* (2013.01); *G06F 9/30007* (2013.01); *G06N 3/02* (2013.01)

(58) Field of Classification Search
CPC ............................... G06F 7/5443; G06F 17/16
See application file for complete search history.

(56) References Cited

U.S. PATENT DOCUMENTS

| | | | |
|---|---|---|---|
| 2015/0326245 A1* | 11/2015 | Li | H03M 7/30 707/693 |
| 2018/0046916 A1* | 2/2018 | Dally | G06N 3/063 |
| 2018/0157969 A1* | 6/2018 | Xie | G06N 3/063 |
| 2018/0210862 A1* | 7/2018 | Akerib | G06F 17/16 |

\* cited by examiner

*Primary Examiner* — Chuong D Ngo
(74) *Attorney, Agent, or Firm* — Schwegman Lundberg & Woessner, P.A.

(57) ABSTRACT

An accelerator for increasing the processing speed of a processor. The accelerator operates in two distinct modes. In a first mode for dense layer processing, row data sets and column data sets are sent to a multiplier for multiplication. In a second mode for sparse layer processing compressed row data sets are received by a row multiplexer and compressed column data sets are received by a column multiplexer. Each multiplexer is configured to compare the indexes of data sets with one another to determine matching indexes. When indexes match, the matching data sets are selected and sent to the multiplier for multiplication. When indexes do not match, data sets are stored in memory devices for subsequent cycles.

25 Claims, 13 Drawing Sheets

ACCELERATOR FOR PROCESSING DATA

TECHNICAL FIELD

Embodiments described herein generally relate to data processing and more specifically to increasing the speed of a processor.

BACKGROUND

Machine learning and artificial intelligence are quickly becoming the main technology that drives new capabilities in speech recognition, computer vision, object recognition and autonomous driving. The core of this technology, is an artificial neural network that either needs to be trained or be used post-training.

During training and post-training the neural network is continually receiving inputs, making calculations, taking actions, and thus processing data. Thus, neural network accelerators are being created that utilize techniques and hardware to increase processing speeds. These techniques include using a set number of cycles to finish calculations to minimize processing actions. Such techniques are flawed because the accelerators function in the same manner for all layers of a neural network, typically attempting to compress and arrange layers in a more efficient manner. However, each of the layers within a neural network is different. Consequently, while an accelerator may be optimal for some layers of a neural network, major inefficiencies happen when attempting to manipulate other layers of the same network. This results in slower processing times and unneeded power usage.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
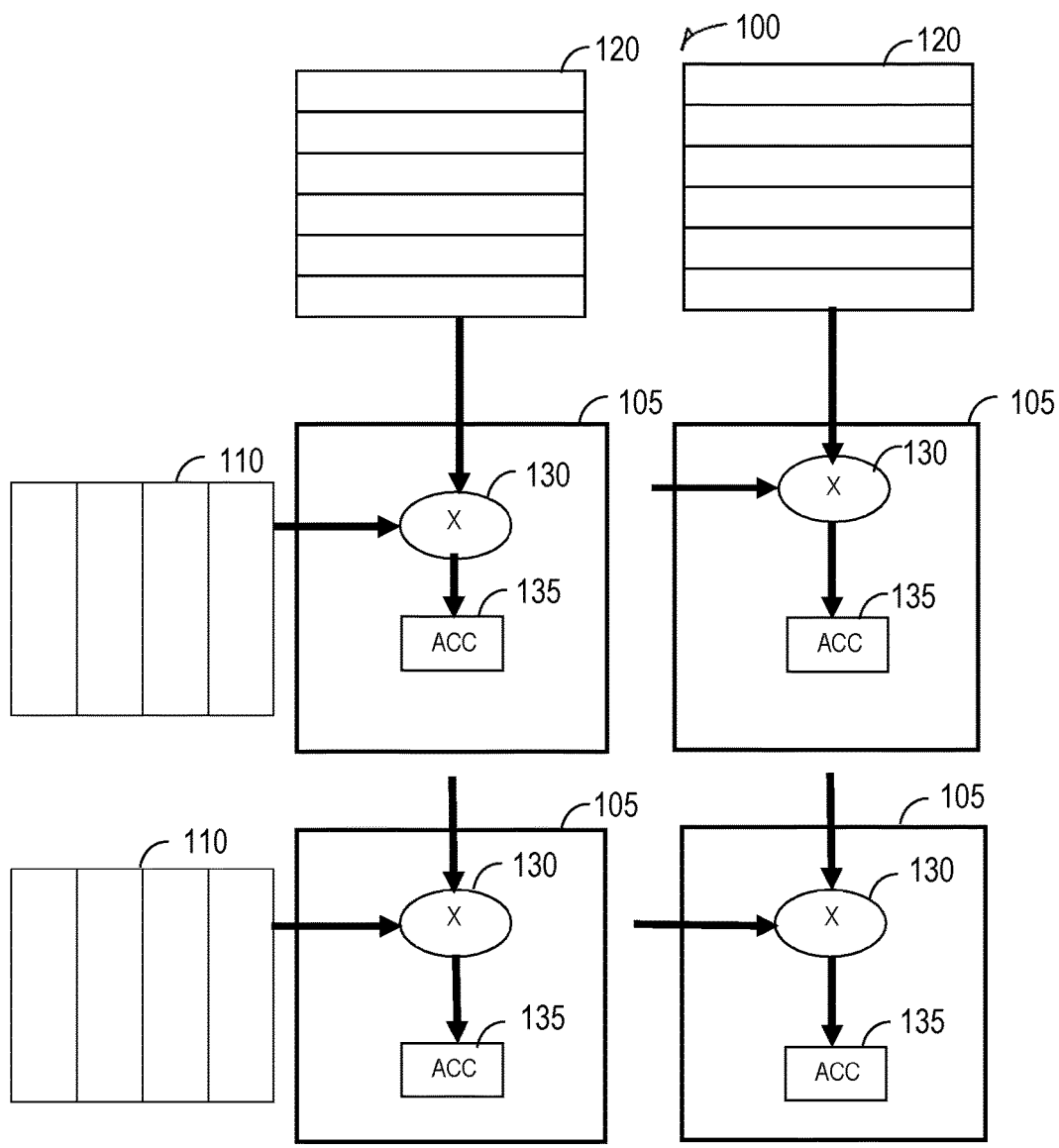
FIG. 1 is a schematic diagram of an accelerator for a processing engine.

An artificial neural network (ANN or neural network) is a computational model based on connections between artificial neurons. Generally neural networks define a structure and training regimen that is used to modify the structure to accomplish a task, such as image classification, decision making, or the like. Training is the iterative performance of a given task by the neural network. Thus, neural networks learn from training rather than being explicitly programmed, as is the case in rules-based systems. Once a neural network is trained the network is placed into a digital setting for use. When a neural network receives a new data set, the neural network makes determinations or inferences regarding the new data set to determine actions. When the trained neural network performs these determinations in a real-world setting, this is referred to as inference.

Neural networks have a unique topology that includes several layers, numerous weights per layer, activation functions, and the like. The layers are grouped into multi-layered perceptrons (MLPs) that make calculations to continually update weights based on an iteratively performed task. Based on these calculations, the neural network determines actions for future iterations of the task during training or makes inferences when receiving new data in the field. The actions and weights of each iteration of the task are stored in memory for use in calculations made during the future iterations.

In this manner, neural networks give rise to many different layers. When a task is initially performed, a significant amount data is taken causing many, if not all elements of a layer to be non-zero. This results in what is referred to as a "dense" layer, or where the layer contains either all or nearly all non-zero elements. In one example a dense layer has at least 80% non-zero elements.

In contrast, when a neural network iteratively performs a task over and over the neural network learns from previous iterations. Thus, as the neural network becomes more efficient at performing a task, fewer data elements per layer are generated. Consequently, many of the data elements found inside a neural network during training and the post-training inference stage are zero. Such layers having many zeros are referred to as "sparse" layers. In one example a sparse layer has less than 80% non-zero elements. Therefore, neural network topologies typically have several dense layers with the rest of the layers being sparse.

During data processing, the main calculations done by the neural network, during either the training or the inference stage, are large matrix multiplications, or direct convolutions, of data arrays created by the network. Modern processors, such as a central processing unit (CPU), a graphics processing unit (GPU), advanced processing unit (APU), or combinations thereof, are not built to efficiently handle these kinds of calculations where both dense and sparse layers exist. GPUs are better at handling these calculations due to their parallel nature, but are still very inefficient in terms of power and overall performance.

Specifically, convolution encompasses multiplying data elements and accumulating the result. When an element in a matrix is zero, when multiplied the result is similarly zero causing the addition of zero in the processing. Still, during convolution of sparse layers, these zero elements are fetched and used during calculations. This process takes both processing time and unneeded memory space within the processing engine providing inefficiencies.

Accelerators provide dedicated hardware to attempt to facilitate and speed up calculations of a network. Typical hardware treats every layer the same, even though layers vary drastically in the amount of data elements that are actually populated in a given layer.

When an accelerator is utilized to speed processing time, the accelerator is used to solve each layer of the network, whether they are dense or sparse. Thus, when an accelerator efficiently speeds processing for dense layers, inefficiencies in the sparse layers exist. Similarly, when techniques are used to speed processing time of sparse layers, these then lack efficiency in speeding dense layers.

Systems and methods described here utilize an accelerator for a processor with two modes: a first mode for dense layers and a second mode for sparse layers where an element such as a software element determines the mode of the accelerator. In the first mode that processes dense layers, row data sets are immediately multiplied with column data sets. In the second mode that processes sparse layers, data sets are compressed to eliminate zeros from the data sets. Each data set includes a value and index (row(Val, Index) or col(Val, Index)), where the index is utilized for reference purposes. The indexes are then utilized to determine appropriateness for multiplication. Therefore, hardware is added to a processing element to compare the indexes of multiple sets of compressed row and compressed column data sets to find row and column data sets with matching indexes.

When row and column data sets are sent to the multiplier, the row and column indexes are compared. If they match, the row and column data sets are multiplied by a multiplier and then accumulated by an accumulator. When the row index and column index do not match, the data set with the lowest index is discarded while the data set with the highest index is stored back in the memory device from which it came. Matching the indexes reduces processing by eliminating fetching zero elements, multiplying by zero, and accumulating such results. Consequently, processing speed is improved when handling a sparse layer and the use of memory space for redundant zero elements is minimized.

While discussed in relation to a neural network, any processing engine has similar functionality and may be accelerated utilizing the accelerators and methodologies described here. The effectiveness of the accelerators and methodologies is greatly enhanced within a neural network because of the varying layers produced by the neural network. Still, accelerators and methodologies described herein pertain to any engine processor.

FIG. 1 is a schematic diagram of an accelerator for a processing engine. In particular, FIG. 1 shows architecture for a dense processing accelerator 100 for matrix multiplication. The accelerator 100 is provided for a plurality of processing elements 105. In one example, the processing elements 105 have a sixteen by eight (16×8) configuration, thus providing one hundred and twenty-eight (128) processing elements. In another example a sixteen by sixteen (16×16) configuration is provided resulting in two hundred and fifty-six (256) processing elements 105. Other configurations are contemplated by this disclosure. Each processing element 105 functions in the same manner.

Each processing element 105 receives row data sets 110 including row elements from a row memory of a memory of a machine (i.e. computing system). Such memory in an example may be a static or replay memory. Each processing element 105 also receives column data sets 120 including column elements from a column memory of the memory of the machine (i.e. computing system). Such memory in an example may be a static or replay memory. In a neural network example the row and column memories receive the memories from a layer of nodes as is known in the art. Each processing element also has a multiplier 130 for multiplying the data sets and an accumulator 135 for receiving and accumulating the product data set.

The matrix calculation (A×B) is thus done by sending the row data set 10 represented by the rows of matrix A and the column data set 120 represented by columns of matrix B to the multiplier 130. Upon multiplication, a resulting matrix C is determined. In this manner, in one example, 16×16 processing elements are calculated in parallel. When a dense layer is provided and the row data set 110 and column data set 120 have few, if any, zero elements, efficient calculations are provided. However, when a sparse layer is presented where the row data sets 110 and column data sets 120 have zeros used throughout calculations and stored, significant inefficiencies occur.

To overcome inefficiencies, the topology of FIG. 1 speeds processing within dense layers while adding extra logic and hardware to also improve efficiencies in speeding processing of sparse layers. Specifically, when an element, that in one example is a software element, determines a layer is dense, accelerators function in a first mode similar to that provided in FIG. 1. When the element determines a layer is sparse, the element has the accelerator to operate in a second mode where indexes of compressed data are received and determined by the processing element. Hardware is provided to compare indexes of numerous row and column data sets and select matching row and column data sets for multiplication.

Figure 2:
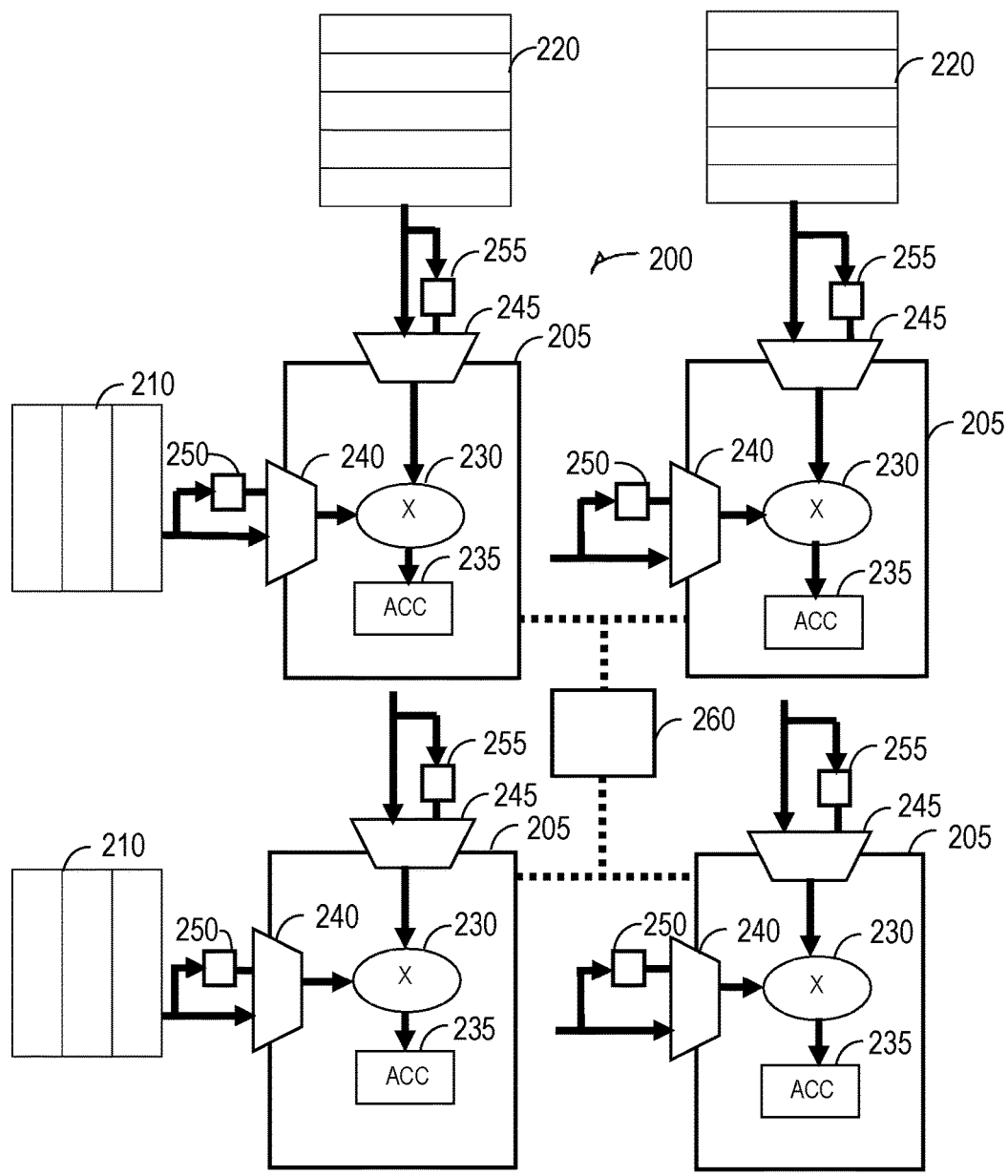
FIG. 2 is a schematic diagram illustrating an example of an accelerator for a processing engine in accordance with an example embodiment.

FIG. 2 is a schematic diagram illustrating an example of an accelerator for a processing engine in accordance with an example embodiment. Specifically, FIG. 2 illustrates architecture of an example accelerator 200 for a processing engine that includes a plurality of processing elements 205. Each processing element 205 receives row data sets 210 including row elements and column data sets 220 including column elements similar to the processing elements of FIG. 1. Each processing element 205 also has a multiplier 230 for multiplying the data sets and an accumulator 235 for accumulating the data.

The accelerator 200 operates in both a first mode and a second mode. In the first mode, when the incoming data sets are considered dense with few, if any zeros, the processing elements 205 operate as described in relation to FIG. 1. Specifically, the data sets are not compressed and all index values are equal. Consequently, the data sets are all sequential and are simply bypassed to the multiplier 230 for multiplication and then sent to the accumulator 235 for accumulation.

When switched from the first mode to the second mode, each processing element 205 operates in the second mode in an identical manner. The second mode is for calculating sparse layers containing numerous zero values. In the second mode the row data set 210 and column data set 220 are both compressed. As a result, each data set includes a value and an index (Row(Val, Index) and Col(Val, Index)) for referencing. Specifically, as a result of the removal of the zero values, indexes are no longer sequential. Therefore, additional hardware is provided to address the non-sequential data sets.

Specifically, a row multiplexer 240 and a column multiplexer 245 are coupled to a processing element 205 to receive the row data sets 210 and column data sets 220, respectfully. The row multiplexer 240 is coupled to and in communication with a row memory device 250 while the column multiplexer 245 is coupled to and in communication with a column memory device 255. In one example the row memory device 250 is a first in first out memory (FIFO). In another example the column memory device 255 is a FIFO. In yet another example both the row and column memory devices 250 and 255 are FIFOs.

the data set with the highest index is stored back in the memory device 250 or 255 from which it was read for use in future cycles.

In the second mode, by eliminating the zeros in the row and column data sets 210 and 220, each data set holds a smaller number of elements, providing significantly more memory storage for future data sets. As an example, in a data set having a sparse matrix that contains forty percent (40%) zeros, the memory holds forty percent (40%) fewer elements. In addition, the non-zero elements are evenly spread, thus when matching indexes are found for the multiplication step, processing speeds are increased. Speeds may increase up to a factor of four times (4×) as a result of an even spread of non-zero element through the matrix. Below is a table showing speedup gained by using the hardware configuration of FIG. 2.

|       | A = 0 | A = .1 | A = .2 | A = .3 | A = .4 | A = .5 | A = .6 | A=.7  | A = .8 | A = .9 |
|-------|-------|--------|--------|--------|--------|--------|--------|-------|--------|--------|
| B = 0 | 0.998 | 1.000  | 1.000  | 0.998  | 0.998  | 0.998  | 0.998  | 0.998 | 0.998  | 0.998  |
| B = .1| 0.998 | 1.076  | 1.080  | 1.082  | 1.080  | 1.080  | 1.082  | 1.082 | 1.082  | 1.082  |
| B = .2| 0.998 | 1.076  | 1.191  | 1.199  | 1.358  | 1.199  | 1.199  | 1.199 | 1.199  | 1.205  |
| B = .3| 0.998 | 1.078  | 1.193  | 1.337  | 1.538  | 1.354  | 1.354  | 1.354 | 1.358  | 1.354  |
| B = .4| 0.998 | 1.078  | 1.193  | 1.347  | 1.555  | 1.566  | 1.566  | 1.561 | 1.556  | 1.561  |
| B = .5| 0.998 | 1.078  | 1.193  | 1.344  | 1.538  | 1.816  | 1.848  | 1.848 | 1.848  | 1.848  |
| B = .6| 0.998 | 1.076  | 1.196  | 1.344  | 1.547  | 1.829  | 2.226  | 2.276 | 2.276  | 2.276  |
| B = .7| 0.998 | 1.078  | 1.193  | 1.347  | 1.547  | 1.829  | 2.236  | 2.876 | 2.977  | 2.943  |
| B = .8| 0.998 | 1.076  | 1.196  | 1.344  | 1.547  | 1.822  | 2.246  | 2.909 | 4.129  | 4.303  |
| B = .9| 0.998 | 1.078  | 1.193  | 1.347  | 1.547  | 1.829  | 2.236  | 2.909 | 4.163  | 7.529  |

In a first mode, the row multiplexer 240 is configured to receive row data sets 210 and the column multiplexer 245 is configured to receive column data sets 220. The processing elements 205 are configured to bypass the row and column memory devices 250 and 255 and send row data sets 210 and column data sets 220 directly to the multiplier 230 in the first mode. In this manner, in the first mode, the accelerator 200 processes the row and column data sets 210, 220 similar to accelerator 100 of FIG. 1. Thus, when an element 260, such as a software element, determines a layer is dense, the element 260 places the accelerator 200 in this first mode to speed processing of the dense layers.

When the element 260 determines that sparse layers are presented, the element 260 switches the accelerator 200 from the first mode to the second mode placing all of the processing elements in a second mode. In the second mode, when a data set row(Val, Index) or col(Val, Index) is received by a processing element from either a row memory or column memory, if the memory device 250 or 255 is empty, the data set is bypassed through or to the output of that memory device 250 or 255. If the memory device 250 or 255 is full, that row or column is stalled. Specifically, control logic prevents additional data sets from being received at the memory device 250 or 255 until the memory device is able to store addition data sets. If the memory device 250 or 255 is neither empty nor full, the incoming data set is stored in that memory device 250 or 255.

The multiplexers then read from the output of the respective memory device 250 or 255 and retrieve the data set row(Val, Index) or col(Val, Index) at the outlet of the memory device 250 or 255. The indexes of row and column data sets are then compared. When the indexes match, the row data and column data are multiplied by the multiplier 235 and accumulated by the accumulator 240 and removed from the processing element. When the indexes do not match, the data set with the lowest index is discarded while The A row of the table represents the sparseness of a row matrix where A=0.1 represents 10% zeros in the row matrix data set, while A=0.9 represents 90% zeros in the row matrix data set. Meanwhile, the B column represents the sparseness of a column matrix where B=0.1 represents 10% zeros in the column matrix data set, while B=0.9 represents 90% zeros in the column data set. The numerals in the table represent the performance gain from increased processing speed using the hardware of FIG. 2 compared to the hardware of FIG. 1.

For example, when both the row data set and the column data set are sparse (A=0.9 and B=0.9) with a heavy density of zero elements, the hardware of FIG. 2 causes a processing speed 7.529 times (or approximately 7×) than the processing speed of the engine of FIG. 1. In another example, when the row data set has a sparseness of 50% (A=0.5 and B=0.5) the processing speed is approximately 1.8 times (or approximately 2×) faster than the processing speed of the engine of FIG. 1. Thus, processing speeds are increased by reducing wasteful fetching and computations. Consequently, larger matrixes may be fetched as a result of the gained performance of the apparatus.

Figure 3:
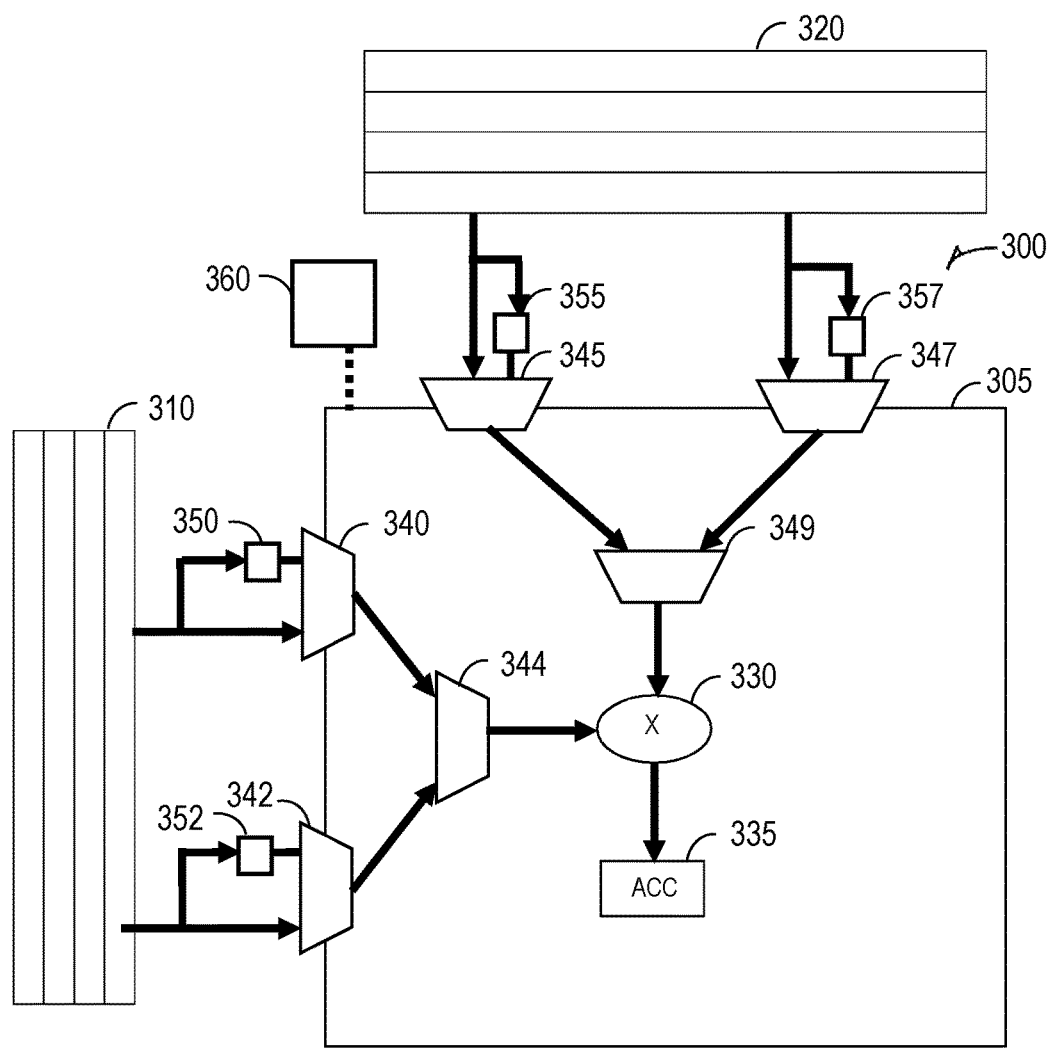
FIG. 3 is a schematic diagram illustrating an example of an accelerator for a processing engine in accordance with an example embodiment.

FIG. 3 is a schematic diagram illustrating an additional example of an accelerator 300 for a processing engine in accordance with an example embodiment. The architecture of the accelerator 300 includes a plurality of processing elements 305. The accelerator 300 operates in both a first mode and a second mode. Specifically, when switched from the first to the second mode each processing element 305 operates in the second mode in an identical manner. Each processing element 305 receives row data sets 310 (row(Val, Index)) including row elements and column data sets 320 (col(Val, Index)) including column elements similar to processing elements of FIG. 1. For illustration purposes only, a single processing element 305 is presented in FIG. 3. In one example, the processing elements 305 have a sixteen by eight (16×8) configuration, thus providing one hundred and twenty-eight (128) processing elements. In another example a sixteen by sixteen (16×16) configuration is provided resulting in two hundred and fifty-six (256) processing elements 305. In yet another configuration a sixteen by thirty-two (16×32) configuration is provided. Other configurations are contemplated by this disclosure.

Each processing element 305 also has a multiplier 330 for multiplying the data sets and an accumulator 335 for accumulating the product data set. Additionally, first, second, and third row multiplexers 340, 342, 344 and first, second, and third column multiplexers 345, 347, 349 are coupled to the processing element 305 to receive the row data sets 310 and column data sets 320, respectfully.

The first row multiplexer 340 is coupled to and in communication with a first row memory device 350 while the second row multiplexer 342 is coupled to and in communication with a second row memory device 352. In one example, either one or both of the first row memory device 350 and second row memory device 352 is a FIFO memory. Each row multiplexer 340, 342 is coupled to and in communication with the third row multiplexer 344 that selects and sends the selected row data set to the multiplier 330.

Similarly, a first column multiplexer 345 is coupled to and in communication with a first column memory device 355, while the second column multiplexer 347 is coupled to and in communication with a second column memory device 357. In one example, either one or both of the first column memory device 355 and second column memory device 357 is a FIFO memory. Each column multiplexer 345, 347 is coupled to and in communication with the third column multiplexer 349 that selects and sends the selected column data set to the multiplier 330.

In a first mode, the row multiplexers 340, 342, 344 are configured to receive row data sets 310 and the column multiplexers 345, 347, 349 are configured to receive column data sets 320. The processing elements 305 are configured to bypass the row and column memory devices 350, 352, 355, and 357 and send row data sets 310 and column data sets 320 directly to the multiplier 330 in the first mode. In this manner, in the first mode, the accelerator 300 processes the row and column data sets 310, 320 similar to accelerator 100 of FIG. 1. Thus, when an element 360, such as a software element, determines a layer is dense, the software element 360 places the accelerator 300 in this first mode to speed processing of the dense layers.

When the element 360 determines that sparse layers are presented, the element 360 switches the accelerator 300 from the first mode to the second mode placing all of the processing elements in a second mode. In the second mode, when a data set row(Val, Index) or col(Val, Index) is received by a processing element 305 from either a row memory or column memory of a machine (i.e. computing system), if the memory device 350, 352, 355, or 357 is empty, the data set is bypassed to the output of that memory device 350, 352, 355, or 357. If the memory device 350, 352, 355, or 357 is full, that row or column is stalled. Specifically, control logic prevents additional data sets from being received at the memory device 350, 352, 355, or 357 until the memory device is able to store addition data sets. If the memory device 350, 352, 355, or 357 is neither empty nor full, the incoming data set is stored in that memory device 350, 352, 355, or 357.

The multiplexers then read from the output of the respective memory device 350, 352, 355, or 357 and retrieve the data set (Val, Index) at the outlet of the memory device 350, 352, 355, or 357. The indexes of row and column data sets are then compared. When the indexes match, the row data and column data are multiplied by the multiplier 335 and accumulated by the accumulator 340 and removed from the processing element. When the indexes do not match, the data set with the lowest index is discarded while the data set with the highest index is stored back in the memory device 350, 352, 355, or 357 from which it was read for use in future cycles.

By providing two sets of row data sets and two sets of column data sets into each cycle of a processing element 300, the processing elements of FIG. 3 process twice as much data per data processing cycle. Consequently, the architecture of FIG. 3 increases processing speed of the accelerator 300 by double (2×) compared to the processing speed of the accelerator 200 of FIG. 2.

Figure 4A:
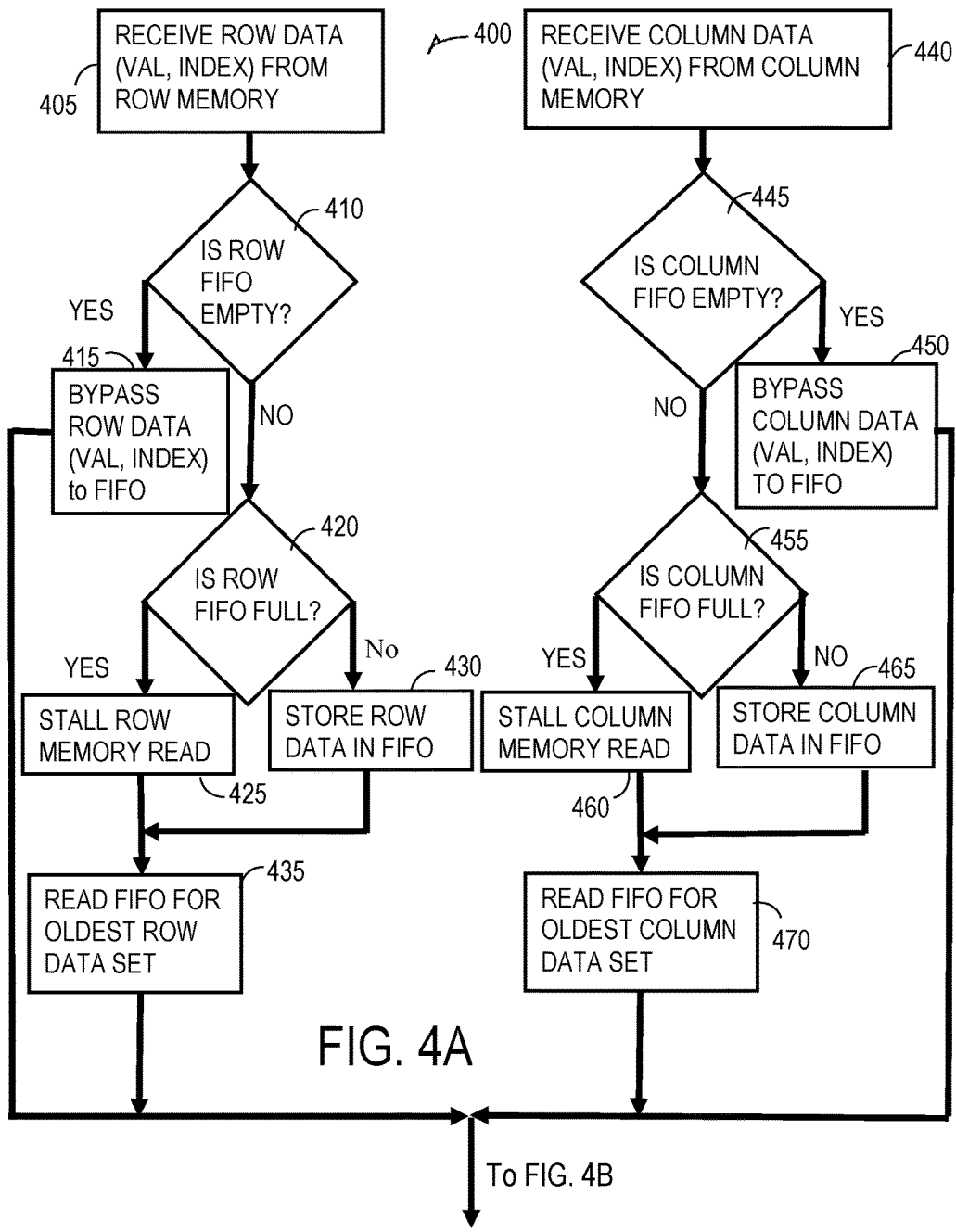
FIG. 4A is a flow block diagram illustrating an example of a methodology of operating an accelerator in accordance with an example embodiment.
Figure 4B:
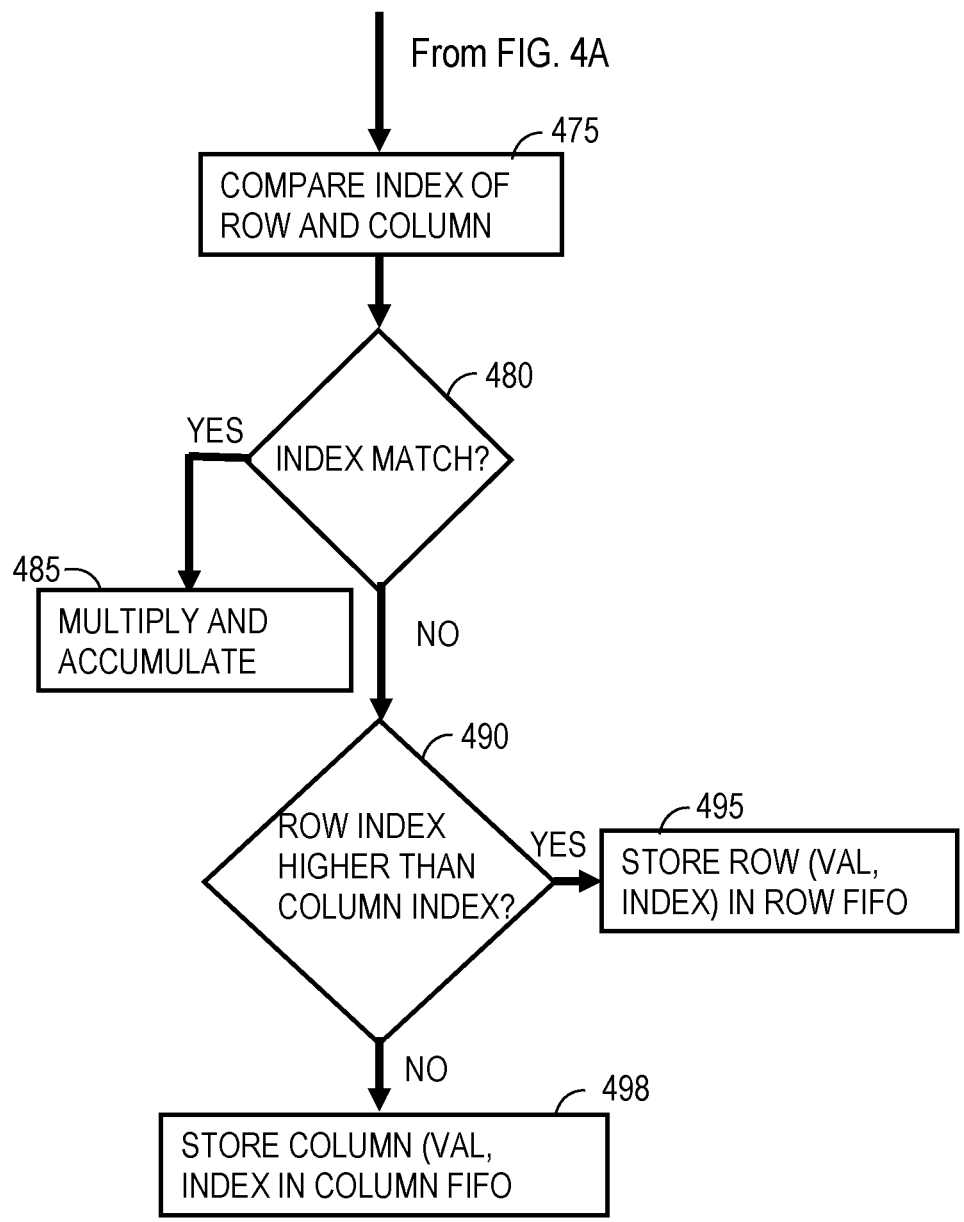
FIG. 4B is a flow block diagram illustrating an example of a methodology of operating an accelerator in accordance with an example embodiment.

FIGS. 4A-4B illustrate a flow block diagram illustrating an example of a methodology of operating an accelerator in accordance with an example embodiment. Specifically, FIGS. 4A-4B provides a block flow diagram of an example method of increasing processing speed 400 of an accelerator by functioning in a second mode. While the diagram may represent a methodology representing a two by two outer matrix configuration, a plurality of processing elements each containing the hardware described in examples herein and required to multiply and accumulate using the methodologies described is contemplated. In one example sixteen rows and sixteen columns could be utilized, in another example, thirty-two rows and sixteen columns are provided for processing.

In the example of FIG. 4, in the second mode, row data and column data from a main memory of a machine (computing system) is compressed to eliminate zeros in the data to form compressed row and column data sets each containing a value and index (row(Val, Index), col(Val, Index)) for reference. At 405, compressed row data sets each having the data value and row index are received at a processing element. When the row data sets are compressed the index order of the data sets are maintained such that each processing element receives data sets that have increasing index orders.

At 410, if a row memory device of a processing element is empty, at 415 the received value and index are bypassed through the row memory device of the processing element. In one example, the row memory device is a FIFO. In another example the processing element has first and second row memory devices with each being a row memory device. At 410, if the row memory device is not empty, a determination is made at 420 regarding whether the row memory device of the processing element is full. If at 420, the row memory device is full, at 425 the row memory read of the processing element is stalled. Specifically, control logic prevents additional data sets from being received at the row memory device until the memory device is able to store addition data sets. If at 420, the row memory device is not full, at 430 the row value and index is stored in the row memory device for future cycle comparison. At 435, after storage, the row memory device is read for the oldest row data set for comparison with a column data set that is similarly selected, or read, as will be described.

Contemporaneously, at 440, compressed column data sets each having a value and column index are received at each processing element. In the context of this disclosure, contemporaneously references to actions or functions that occur at the same time or approximately the same time. As an example, steps 405 and 440 are considered to be occurring at approximately the same time. When the column data sets are compressed the index order of the data sets are maintained such that each processing element receives data sets that have increasing index orders.

At 445, if a column memory device of a processing element is empty, at 450 the received value and index are bypassed through the column memory device of the processing element. In one example, the column memory device is a FIFO. In another example the processing element has first and second column memory devices with each being a column memory device. At 445, if the column memory device is not empty, a determination is made at 455 regarding whether the column memory device of the processing element is full. If at 455, the column memory device is full, at 460 the column memory read of the processing element is stalled. Specifically, control logic prevents additional data sets from being received at the memory device until the column memory device is able to store addition data sets. If at 455, the column memory device is not full, at 465 the column value and index is stored in the column memory device. At 470, after storage, the column memory device is read for the oldest row data set for comparison with a row data set.

In one example, at 475, the index of the read row data set of step 435 and the index of the read column data set at step 470 are compared. If at 480, the indexes of the row data set and column data set match, the data sets are multiplied, accumulated, and removed from the processing element at 485. If at 480, the indexes of the row data set and column data set do not match, a determination is made at 490 which index is greater. If the row index is greater, at 495 the row value and index are stored in the row memory device from which it was originally read. If the column index is greater, at 498 the column value and index are stored in the column memory device from which it was originally read. The data set with the lower index is automatically discarded.

By utilizing the methodology provided in FIGS. 4A-4B, processing speeds through sparse layers is increased. Additionally, protections are included for stalling to ensure delays in processing are minimized.

Figure 5:
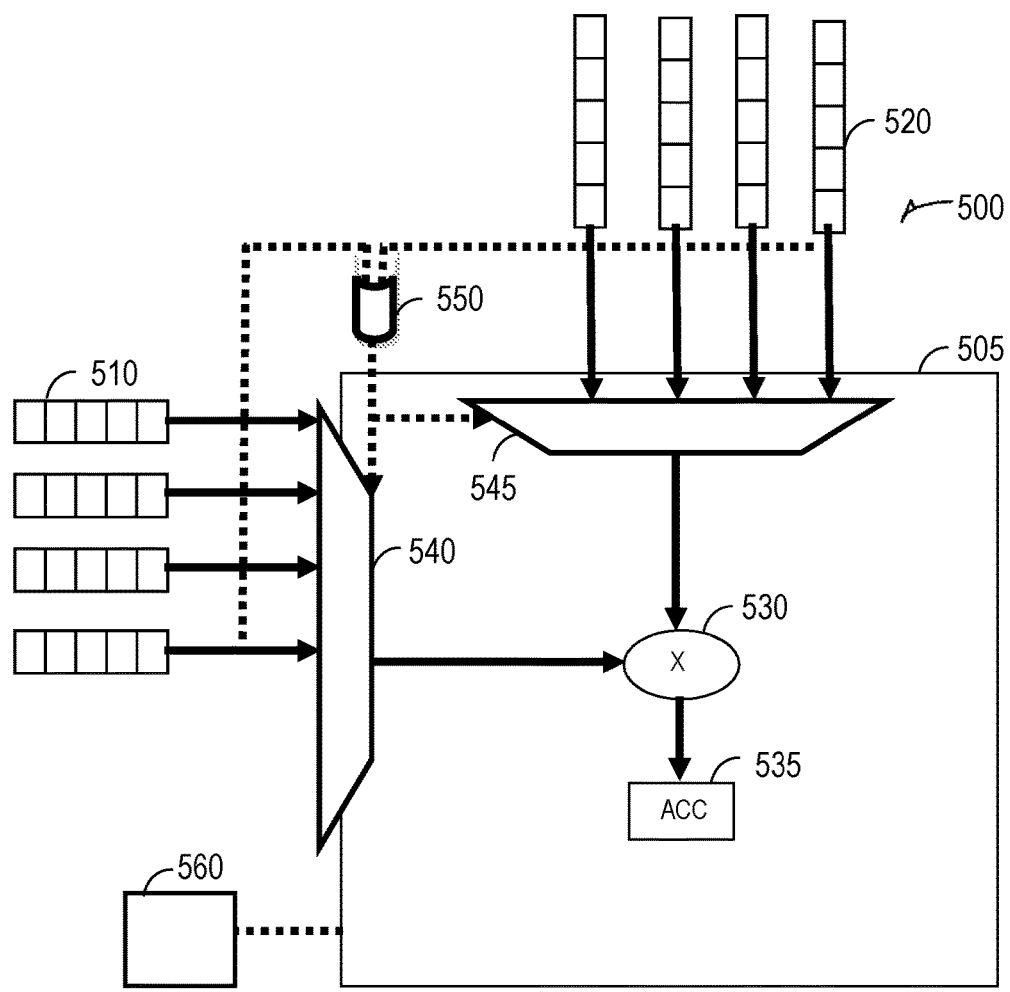
FIG. 5 is a schematic diagram illustrating an example of an accelerator for a processing engine in accordance with an example embodiment.

FIG. 5 is a schematic diagram illustrating an example of an accelerator 500 for a processing engine in accordance with an example embodiment. FIG. 5 illustrates and example accelerator 500 for a processing engine that includes a plurality of processing elements 505. The accelerator 500 is able to operate in both a first mode and a second mode. Specifically, when switched from the first to the second mode each processing element 505 operates in the second mode in an identical manner. Each processing element 505 receives row data sets 510 including row elements and column data sets 520 including column elements similar to processing elements of FIG. 1. Each processing element 505 also has a multiplier 530 for multiplying the data sets and an accumulator 535 for receiving the multiplied data set.

A row multiplexer 540 and a column multiplexer 545 are provided to receive the row data sets 510 and column data sets 520 respectfully. The row multiplexer 540 is in communication with a pointer 550 that in one example is read pointer. A pointer is software that presents programing language to reference to a value stored in a memory. In particular, the pointer 550 receives index values of the each of the plurality of row data sets and plurality of column data sets. The pointer 550 then continuously provides the lowest matching row index and column index to the row multiplexer 540 and column multiplexer 545 for selection to be sent to the multiplier 530 for multiplication.

In a first mode, when the row multiplexer 540 receives row data sets and the column multiplexer 545 receives column data sets. The multiplexers 540, 545 are configured to bypass the pointer 550 and send row data sets and column data sets directly to the multiplier 530. In this manner, in the first mode, the accelerator 500 processes the row and column data sets similar to accelerator 100 of FIG. 1. Thus, when an element 560 such as a software element determines a layer is dense, the element places the accelerator 500 in this first mode to speed processing of the dense layers.

When the element 560 determines that sparse layers are presented, the element switches the accelerator 500 from the first mode to a second mode. In the second mode, the row multiplexer 540 is configured to receive compressed row data and the column multiplexer 545 is configured to receive compressed column data. Then the pointer 550 determines and references the lowest matching row data set index and column data set index. The multiplexers 540, 545 are configured to select the lowest matching row data set and column data set and send the lowest matching row data set and column data set to the multiplier 530. Thus, compressed row data sets 510 and compressed column data sets 520 are selected without the need of a memory device such as a first in and first out memory as part of the hardware. Consequently, processing speed is increased at a similar rate as the processing engine of FIG. 4.

Figure 6:
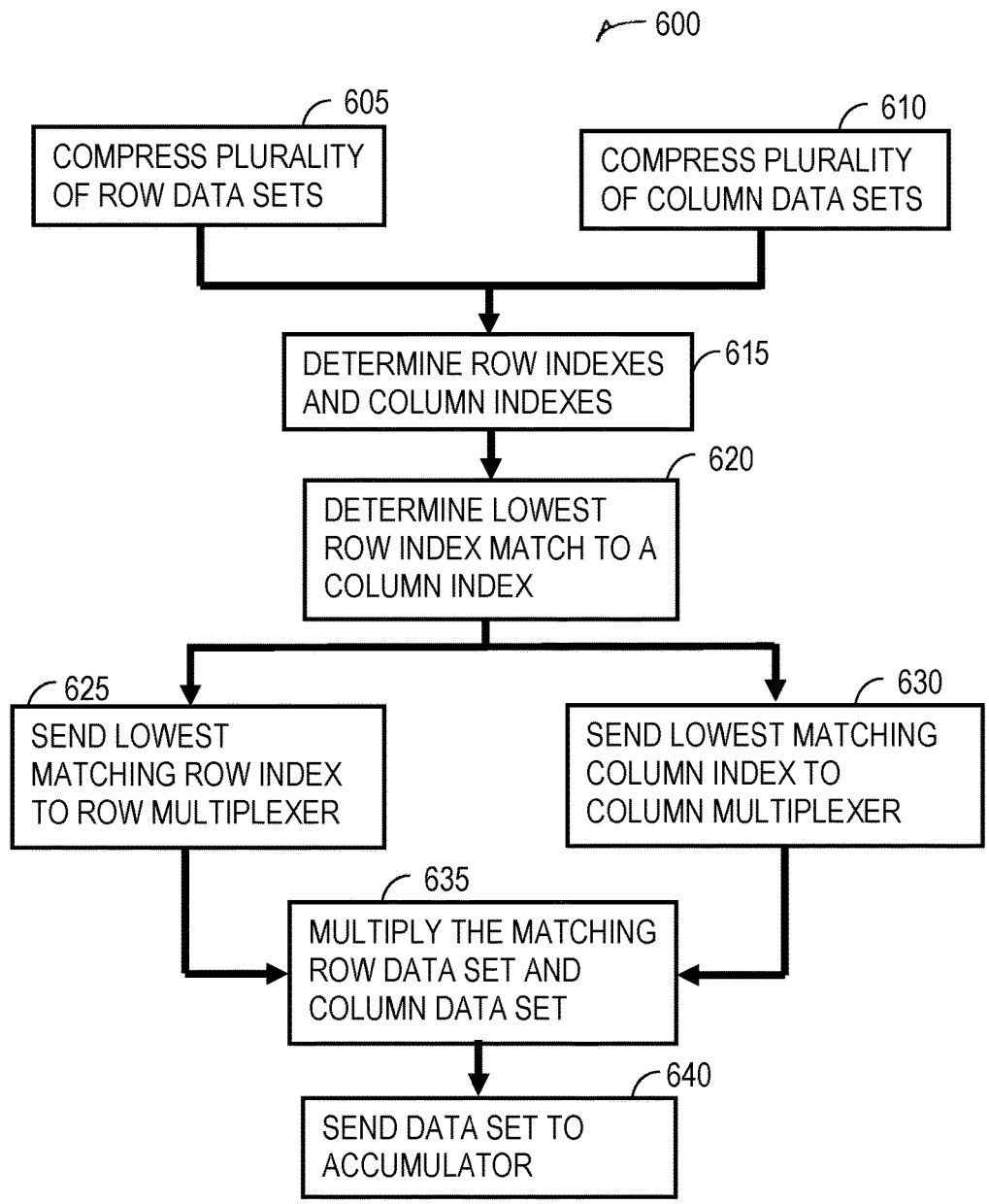
FIG. 6 is a flow block diagram illustrating an example of a methodology of operating an accelerator in accordance with an example embodiment.

FIG. 6 is a flow block diagram illustrating an example of a methodology of operating an accelerator in accordance with an example embodiment. FIG. 6 illustrates an example of a flow diagram showing a method 600 for increasing the speed of the accelerator 500 of FIG. 5 using a second mode. At 605, row data is compressed to eliminate zeros to form a plurality of compressed row data sets, each row data set including a row value and row index (row(Val, Index)). Contemporaneously, at 610, column data is compressed to eliminate zeros to form a plurality of compressed column data sets, each column data set including a column value and column index (col(Val, Index).

At 615, a read pointer determines each row data index and each column data index. At 620, the processing element utilizes the read pointer to determine the lowest row index and column index match. At 625, the row data set with the lowest row index matching a column index is sent by the row multiplexer contemporaneously as the column data set with the lowest column index matching a row index is sent by the column multiplexer at 630. The read pointer, at this time, continues to determine matching indexes to be sent to the multiplier for multiplication.

At 635, the row data set with the lowest matching row index is multiplied with the column data set with the lowest matching column index. At 640, after multiplication of any of the row data sets with the column data sets, a resultant data set is sent from the multiplier to the accumulator for accumulation and removal from the processing element. Therefore, by utilizing a read pointer, row and column data set indexes may be matched without using a temporary memory device such as provided in previous examples. Thus, the improved functionality remains with reduced hardware being implemented.

Figure 7:
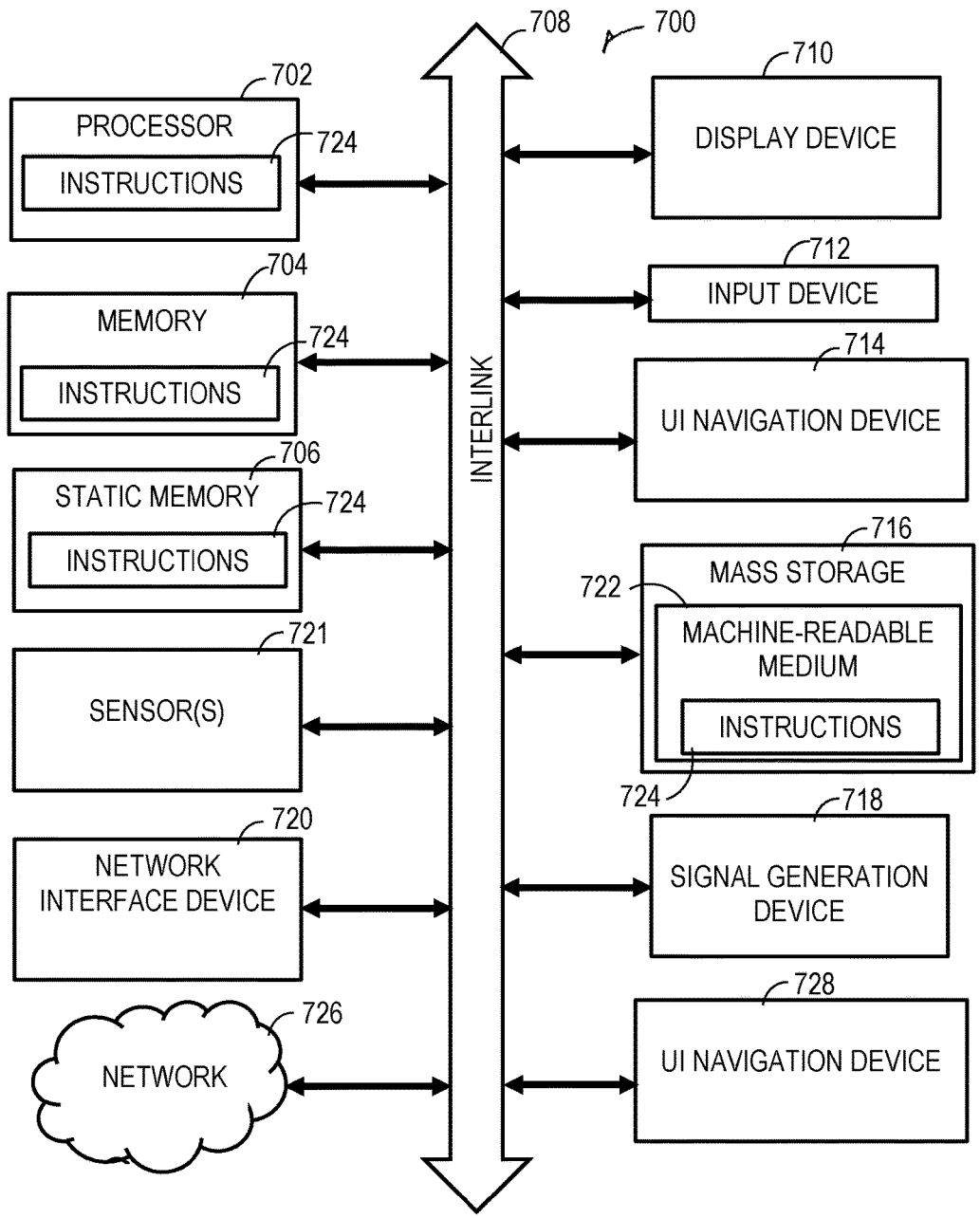
FIG. 7 is a block diagram illustrating an example of a machine upon which one or more embodiments may be implemented in accordance with an example embodiment.

FIG. 7 illustrates a block diagram of an example machine 700 upon which any one or more of the techniques (e.g., methodologies) discussed herein may perform. In alternative embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, engines, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, the computer readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

Machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The accelerator of any example, including but not limited to the accelerators 100, 200, 300, or 500 in one example is part of the processor 702, and in another example is a standalone accelerator coupled to the processor 702. The machine 700 may further include a display unit 710, an alphanumeric input device 712 (e.g., a keyboard), and a user interface (UI) navigation device 714 (e.g., a mouse). In an example, the display unit 710, input device 712 and UI navigation device 714 may be a touch screen display. The machine 700 may additionally include a storage device (e.g., drive unit) 716, a signal generation device 718 (e.g., a speaker), a network interface device 720, and one or more sensors 721, such as a global positioning system (GPS) sensor, compass, accelerometer, or other sensor. The machine 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within static memory 706, or within the hardware processor 702 during execution thereof by the machine 700. In an example, one or any combination of the hardware processor 702, the main memory 704, the static memory 706, or the storage device 716 may constitute machine readable media.

While the machine readable medium 722 is illustrated as a single medium, the term "machine readable medium" may include a single medium or multiple media (e.g., a centralized or distributed database, and/or associated caches and servers) configured to store the one or more instructions 724.

The term "machine readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 700, and includes digital or analog communications signals or other intangible medium to facilitate communication of such software.

Figure 8:
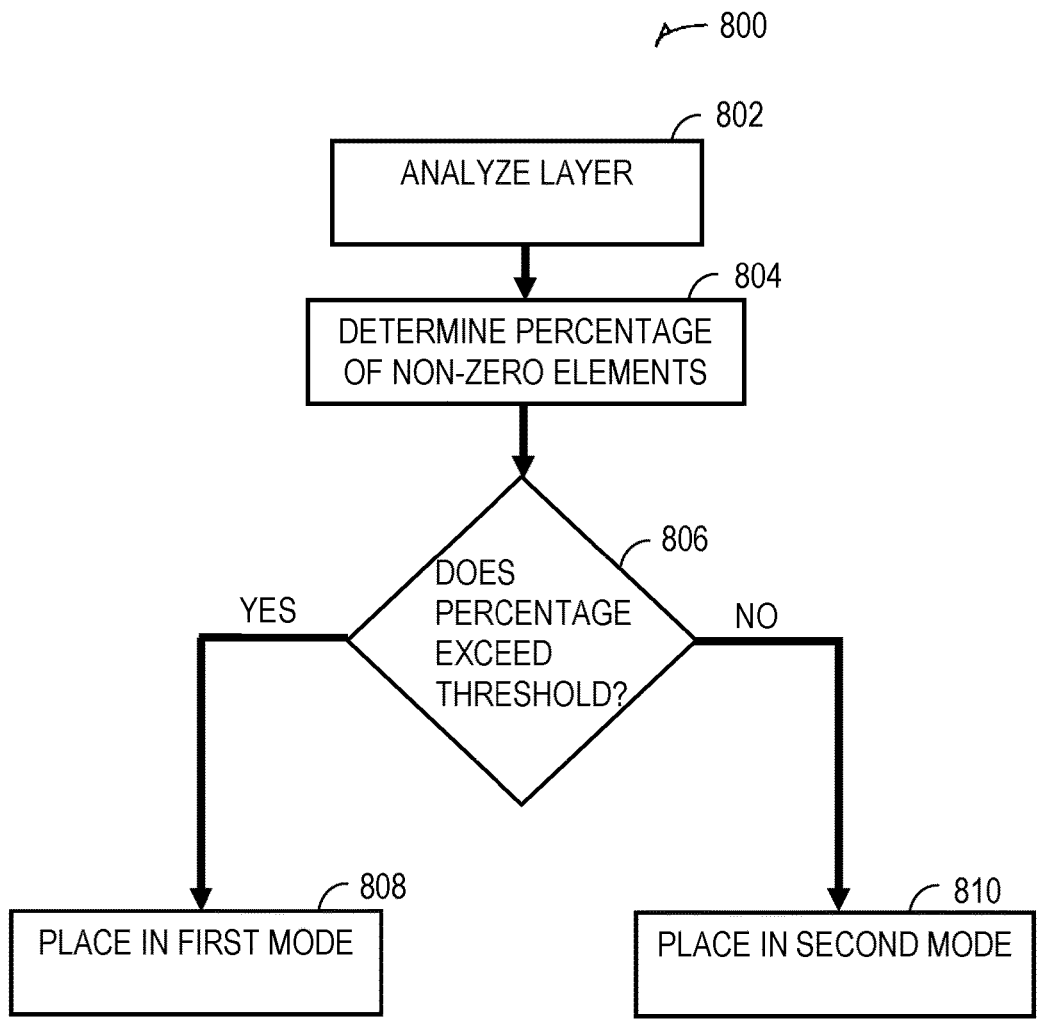
FIG. 8 illustrates an example method of placing an accelerator in a first mode or second mode as a result of following instructions provided by a machine in accordance with an example embodiment.

FIG. 8 illustrates an example method of placing an accelerator in a first mode or second mode 800 as a result of following instructions provided by a machine. The machine 700 is an example of the machine of the method. Similarly, the accelerators 200, 300, and 500 are example accelerators for this method while elements 260, 360, and 560 are example software elements for providing such functionality.

At 802, a software element analyzes a layer of data sets in a memory. At 804, the software element determines the percentage of non-zero elements within the layer. At decision 806, if the percentage of non-zero elements exceeds a threshold percentage, an accelerator is placed in a first mode at 808. If at decision 806 the percentage of non-zero elements is below the threshold percentage, the accelerator is place in a second mode at 810. In one example the threshold percentage is 20%.

FIGS. 9-12 are block diagrams of computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 9:
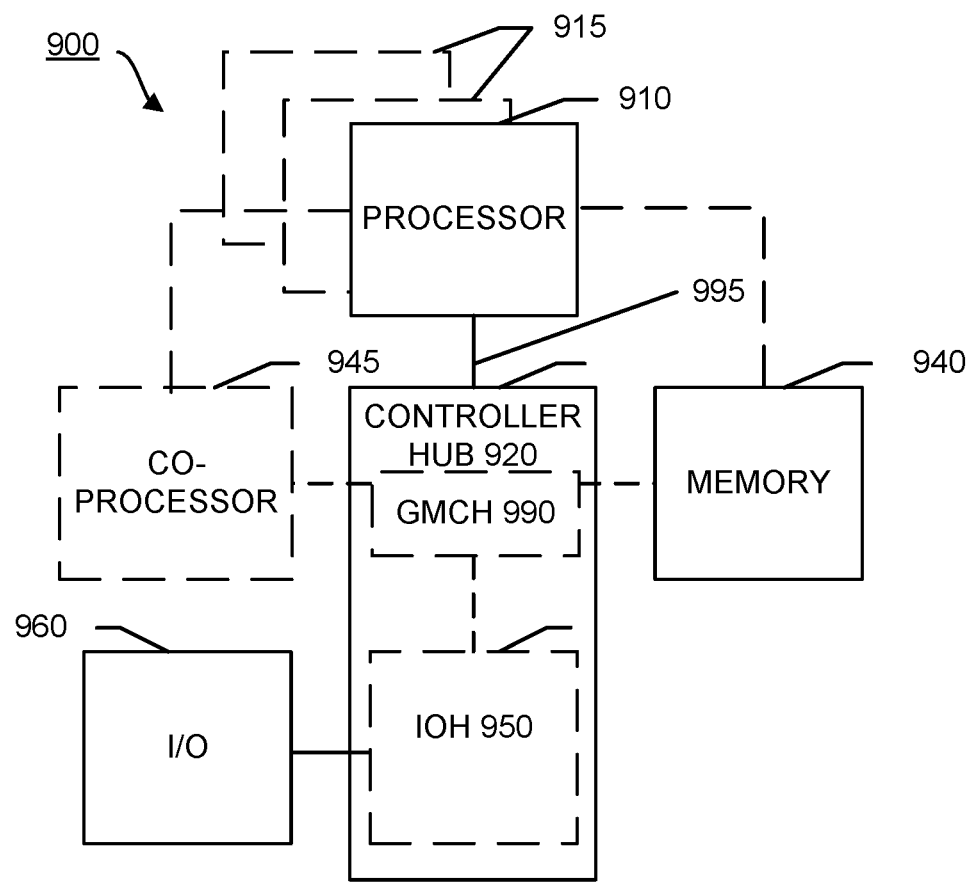
FIG. 9 is a block diagram illustrating a system upon which one or more embodiments may be implemented in accordance with an example embodiment.

Referring now to FIG. 9, shown is a block diagram of a system 900 according to an embodiment. The system 900 may include one or more processors 910, 915, which are coupled to a controller hub 920. The accelerator of any example, including but not limited to the accelerators 100, 200, 300, or 500 in one example is part of one or more processors 910, and in another example is a standalone accelerator coupled to the one or more processors 910. In an embodiment the controller hub 920 includes a graphics memory controller hub (GMCH) 990 and an Input/Output Hub (IOH) 950 (which may be on separate chips); the GMCH 990 includes memory and graphics controllers to which are coupled memory 940 and a coprocessor 945; the IOH 950 is couples input/output (I/O) devices 960 to the GMCH 990. Alternatively, one or both of the memory and graphics controllers are integrated within the processor (as described herein), the memory 940 and the coprocessor 945 are coupled directly to the processor 910, and the controller hub 920 in a single chip with the IOH 950.

The optional nature of additional processors 915 is denoted in FIG. 9 with broken lines. Each processor 910, 915 may include one or more of processing cores.

The memory 940 may be, for example, dynamic random access memory (DRAM), phase change memory (PCM), or a combination of the two. For at least one embodiment, the controller hub 920 communicates with the processor(s) 910, 915 via a multi-drop bus, such as a frontside bus (FSB), point-to-point interface such as QuickPath Interconnect (QPI), or similar connection 995.

In an embodiment, the coprocessor 945 is a special-purpose processor, such as, for example, a high-throughput MIC processor, a network or communication processor, compression engine, graphics processor, GPGPU, embedded processor, or the like. In an embodiment, controller hub 920 may include an integrated graphics accelerator.

There can be a variety of differences between the physical resources 910, 915 in terms of a spectrum of metrics of merit including architectural, microarchitectural, thermal, power consumption characteristics, and the like.

In an embodiment, the processor 910 executes instructions that control data processing operations of a general type. Embedded within the instructions may be coprocessor instructions. The processor 910 recognizes these coprocessor instructions as being of a type that should be executed by the attached coprocessor 945. Accordingly, the processor 910 issues these coprocessor instructions (or control signals representing coprocessor instructions) on a coprocessor bus or other interconnect, to coprocessor 945. Coprocessor(s) 945 accept and execute the received coprocessor instructions.

Figure 10:
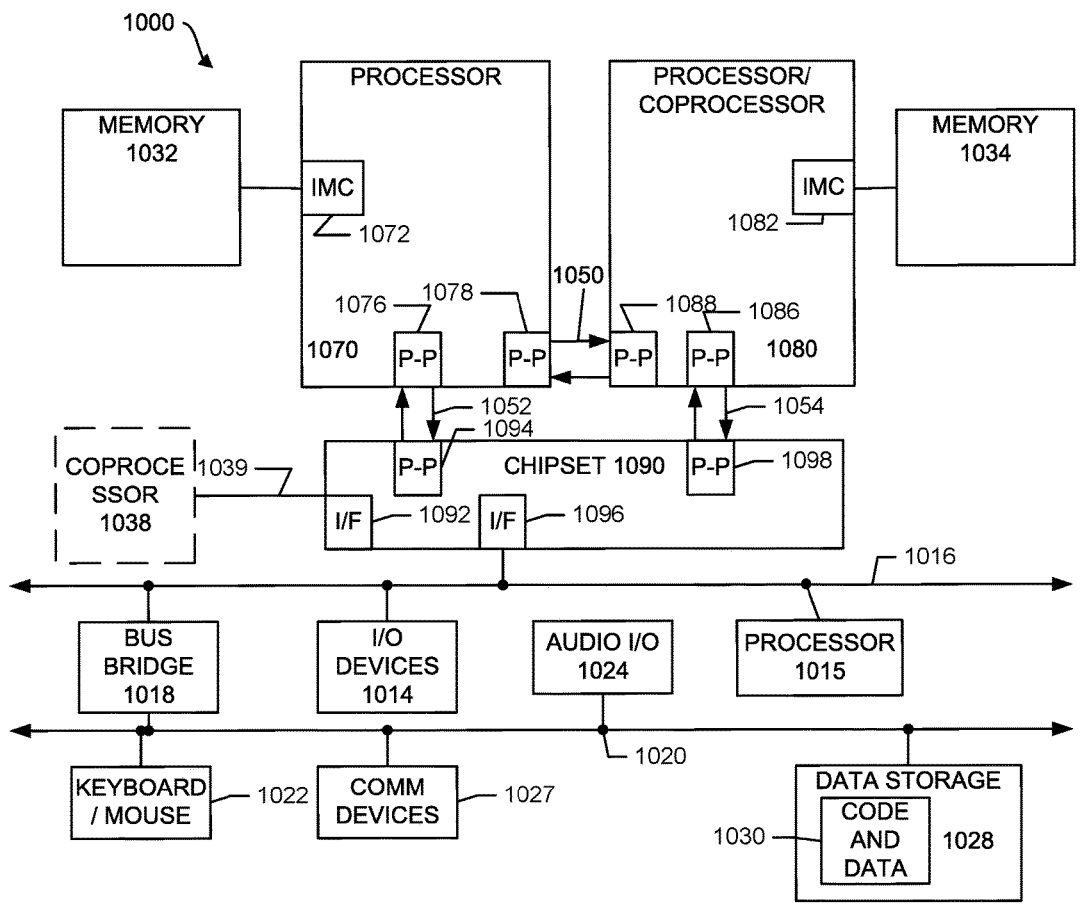
FIG. 10 is a block diagram illustrating a system upon which one or more embodiments may be implemented in accordance with an example embodiment.

Referring now to FIG. 10, shown is a block diagram of a first more specific system 1000 in accordance with an embodiment. As shown in FIG. 10, multiprocessor system 1000 is a point-to-point interconnect system, and includes a first processor 1070 and a second processor 1080 coupled via a point-to-point interconnect 1050. In an embodiment, processors 1070 and 1080 are respectively processors 910 and 915, while coprocessor 1038 is coprocessor 945. In another embodiment, processors 1070 and 1080 are respectively processor 910 coprocessor 945.

Processors 1070 and 1080 are shown including integrated memory controller (IMC) units 1072 and 1082, respectively. Processor 1070 also includes as part of its bus controller units point-to-point (P-P) interfaces 1076 and 1078; similarly, second processor 1080 includes P-P interfaces 1086 and 1088. Processors 1070, 1080 may exchange information via a point-to-point (P-P) interface 1050 using P-P interface circuits 1078, 1088. As shown in FIG. 10, IMCs 1072 and 1082 couple the processors to respective memories, namely a memory 1032 and a memory 1034, which may be portions of main memory locally attached to the respective processors.

Processors 1070, 1080 may each exchange information with a chipset 1090 via individual P-P interfaces 1052, 1054 using point to point interface circuits 1076, 1094, 1086, 1098. Chipset 1090 may optionally exchange information with the coprocessor 1038 via a high-performance interface 1039. In an embodiment, the coprocessor 1038 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1090 may be coupled to a first bus 1016 via an interface 1096. In an embodiment, first bus 1016 may be a Peripheral Component Interconnect (PCI) bus, or a bus such as a PCI Express bus or another third generation I/O interconnect bus, although the scope of the present invention is not so limited.

As shown in FIG. 10, various I/O devices 1014 may be coupled to first bus 1016, along with a bus bridge 1018 which couples first bus 1016 to a second bus 1020. In an embodiment, one or more additional processor(s) 1015, such as coprocessors, high-throughput MIC processors, GPGPU's, accelerators (such as, e.g., graphics accelerators or digital signal processing (DSP) units), field programmable gate arrays, or any other processor, are coupled to first bus 1016. In an embodiment, second bus 1020 may be a low pin count (LPC) bus. Various devices may be coupled to a second bus 1020 including, for example, a keyboard and/or mouse 1022, communication devices 1027 and a storage unit 1028 such as a disk drive or other mass storage device which may include instructions/code and data 1030, in an embodiment. Further, an audio I/O 1024 may be coupled to the second bus 1020. Note that other architectures are possible. For example, instead of the point-to-point architecture of FIG. 10, a system may implement a multi-drop bus or other such architecture.

Figure 11:
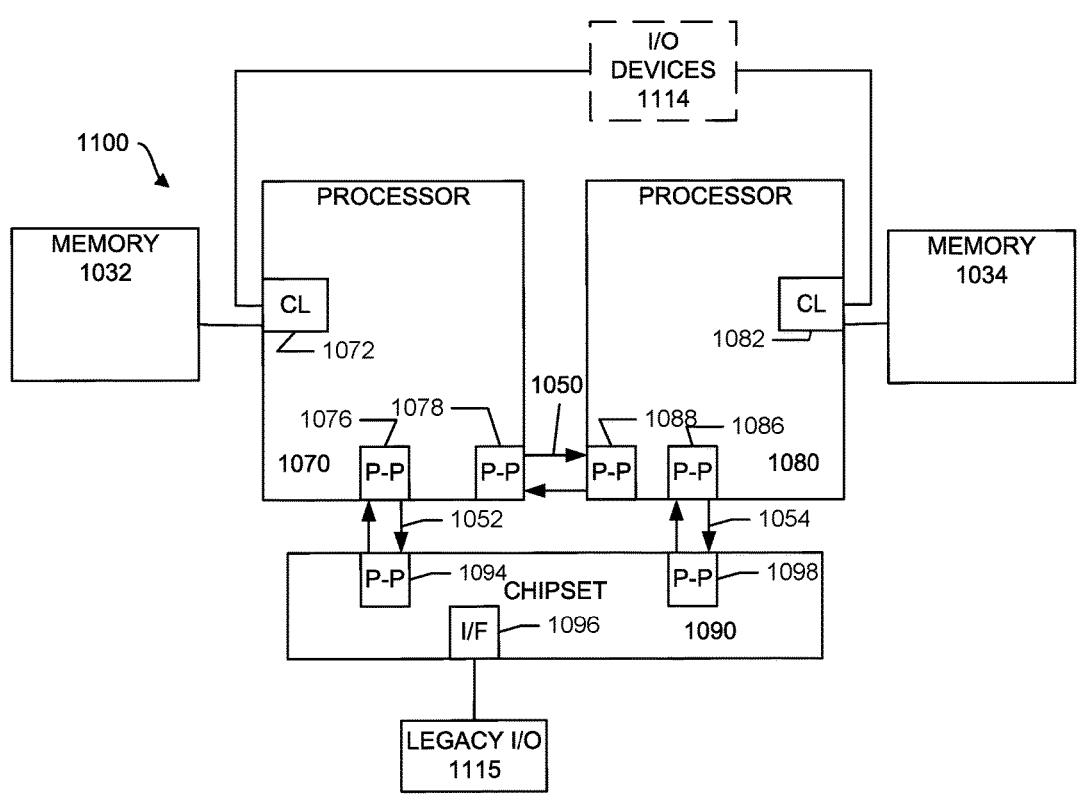
FIG. 11 is a block diagram illustrating a system upon which one or more embodiments may be implemented in accordance with an example embodiment.

Referring now to FIG. 11, shown is a block diagram of a second more specific system 1100 in accordance with an embodiment. Like elements in FIGS. 10 and 11 bear like reference numerals, and certain aspects of FIG. 10 have been omitted from FIG. 11 in order to avoid obscuring other aspects of FIG. 11.

FIG. 11 illustrates that the processors 1070, 1080 may include integrated memory and I/O control logic ("CL") 1072 and 1082, respectively. Thus, the CL 1072, 1082 include integrated memory controller units and include I/O control logic. FIG. 11 illustrates that not only are the memories 1032, 1034 coupled to the CL 1072, 1082, but also that I/O devices 1114 are also coupled to the control logic 1072, 1082. Legacy I/O devices 1115 are coupled to the chipset 1090.

Figure 12:
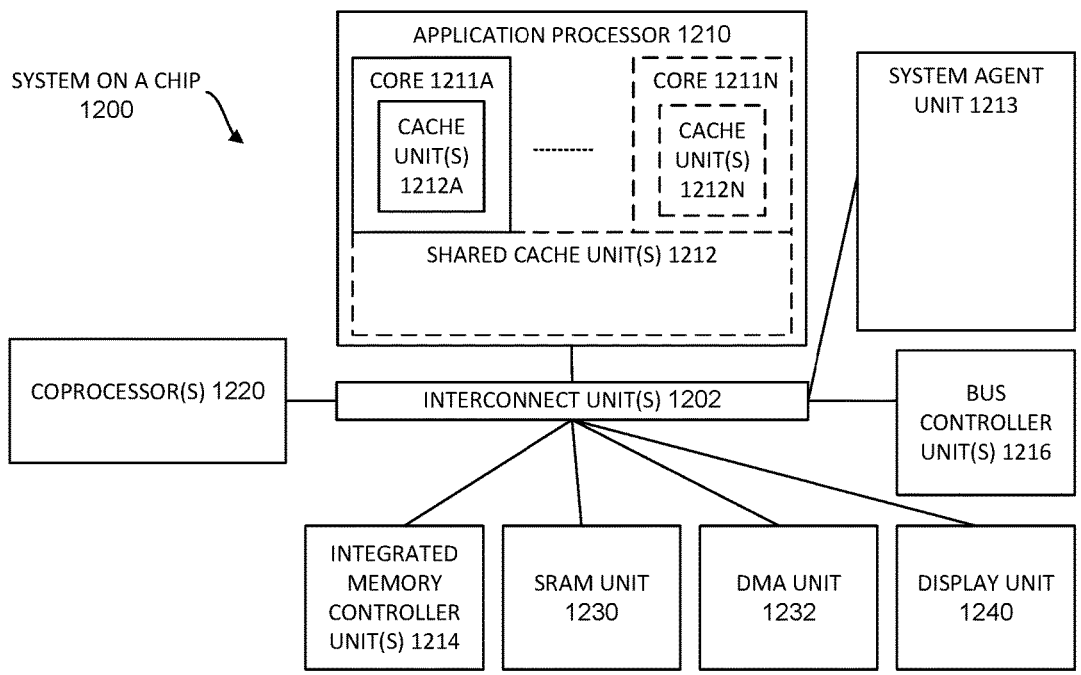
FIG. 12 is a block diagram illustrating a system upon which one or more embodiments may be implemented in accordance with an example embodiment.

Referring now to FIG. 12, shown is a block diagram of a SoC 1200 in accordance with an embodiment. Dashed lined boxes are optional features on more advanced SoCs. In FIG. 12, an interconnect unit(s) 1202 is coupled to: an application processor 1210 which includes a set of one or more cores 1211A-N and shared cache unit(s) 1212A-N; a system agent unit 1213; a bus controller unit(s) 1216; an integrated memory controller unit(s) 1214; a set or one or more coprocessors 1220 which may include integrated graphics logic, an image processor, an audio processor, and a video processor; an static random access memory (SRAM) unit 1230; a direct memory access (DMA) unit 1232; and a display unit 1240 for coupling to one or more external displays. In an embodiment, the coprocessor(s) 1220 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1030 illustrated in FIG. 10, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

All the example accelerators and methodologies described herein reduce power consumption while improving processing speed and performance. Thus, processing engines including for training neural networks and for edge devices such as drones, personal assistants, and the like for inference functionality are improved. The accelerators provide improvements in a range between 50%-100% increase in processing speeds for dense workloads and up to a range of 400%-500% for sparse workloads in extreme cases such as where pruning techniques are used to create more zeros in data sets. Thus, performance ratio for both servers having many hardware devices with a constant power budget, and edge devices having a low power budget is vastly improved.

VARIOUS NOTES & EXAMPLES

Example 1 is a system for accelerating processing of one or more processors, the system comprises: a computer readable medium including instructions; and at least one processor that, when the instructions are executed, is configured to: operate a processing element in a first mode, wherein operating the processing element in the first mode comprises: receiving row data sets and transmitting the row data sets to a multiplier; and receiving column data sets and transmitting the column data sets to the multiplier; and operate the processing element in a second mode, wherein operating the processing element in the second mode comprises: selecting a row data set to send to the multiplier based on matching a row data set index with a column data set index; and selecting a column data set to send to the multiplier based on matching a column data set index with a row data set index.

In Example 2, the subject matter of Example 1 optionally includes wherein operating the processing element in the second mode further comprises: receiving the row data set at a row multiplexer coupled to the processing element.

In Example 3, the subject matter of Example 2 optionally includes wherein operating the processing element in the second mode further comprises: receiving the row data set at the row multiplexer from a row memory device coupled to the row multiplexer and the processing element.

In Example 4, the subject matter of Example 3 optionally includes wherein the row memory device is a first in first out memory device.

In Example 5, the subject matter of any one or more of Examples 3-4 optionally include wherein operating the processing element in the second mode further comprises: prior to receiving the row data set at the row multiplexer, receiving the row data set at the row memory device.

In Example 6, the subject matter of Example 5 optionally includes wherein operating the processing element in the second mode further comprises: after receiving the row data set at the row memory device, bypassing the row data set through the row memory device.

In Example 7, the subject matter of any one or more of Examples 5-6 optionally include wherein operating the processing element in the second mode further comprises: after receiving the row data set at the row memory device, preventing transmission of additional row data sets to the row memory device.

In Example 8, the subject matter of any one or more of Examples 5-7 optionally include wherein operating the processing element in the second mode further comprises: after receiving the row data set at the row memory device, storing the row data set in the row memory device.

In Example 9, the subject matter of any one or more of Examples 3-8 optionally include wherein the row multiplexer is one of a first row multiplexer coupled to the processing element or a second row multiplexer coupled to the processing element.

In Example 10, the subject matter of Example 9 optionally includes wherein the row memory device is one of a first row memory device coupled to the first row multiplexer and the processing element or a second row memory device coupled to the second row multiplexer and the processing element.

In Example 11, the subject matter of any one or more of Examples 1-10 optionally include wherein operating the processing element in the second mode further comprises: receiving the column data set at a column multiplexer coupled to a processing element.

In Example 12, the subject matter of Example 11 optionally includes wherein operating the processing element in the second mode further comprises: receiving the column data set at the column multiplexer from a column memory device coupled to the column multiplexer and the processing element.

In Example 13, the subject matter of Example 12 optionally includes wherein the column memory device is a first in first out memory device.

In Example 14, the subject matter of any one or more of Examples 12-13 optionally include wherein operating the processing element in the second mode further comprises: prior to receiving the column data set at the column multiplexer, receiving the column data set at the column memory device.

In Example 15, the subject matter of Example 14 optionally includes wherein operating the processing element in the second mode further comprises: after receiving the column data set at the column memory device, bypassing the column data set through the column memory device.

In Example 16, the subject matter of any one or more of Examples 14-15 optionally include wherein operating the processing element in the second mode further comprises: after receiving the column data set at the column memory device, preventing transmission of additional column data sets to the column memory device.

In Example 17, the subject matter of any one or more of Examples 14-16 optionally include wherein operating the processing element in the second mode further comprises: after receiving the column data set at the column memory device, storing the column data set in the column memory device.

In Example 18, the subject matter of any one or more of Examples 12-17 optionally include wherein the column multiplexer is one of a first column multiplexer coupled to the processing element or a second column multiplexer coupled to the processing element.

In Example 19, the subject matter of Example 18 optionally includes wherein the column memory device is one of a first column memory device coupled to the first column multiplexer and the processing element or a second memory device coupled to the second column multiplexer and the processing element.

In Example 20, the subject matter of any one or more of Examples 1-19 optionally include wherein operating the processing element in the second mode further comprises: comparing a row data set index to a column data set index that does not match; and discarding one of the row data set or column data set based on the comparison of the row data set index to the column data set index.

In Example 21, the subject matter of Example 20 optionally includes wherein operating the processing element in the second mode further comprises: storing the row data set in the row memory device or storing the column data set in the column memory device based on the comparison of the row data set index to the column data set index.

In Example 22, the subject matter of any one or more of Examples 1-21 optionally include wherein operating the processing element in the second mode further comprises: compressing the row data set prior to selecting to send the row data set to the multiplier.

In Example 23, the subject matter of any one or more of Examples 1-22 optionally include wherein operating the processing element in the second mode further comprises: compressing the column data set prior to selecting to send the column data set to the multiplier.

In Example 24, the subject matter of any one or more of Examples 1-23 optionally include wherein while operating in the second mode, selecting the row data set and selecting the column data set are further based on a read pointer reference.

In Example 25, the subject matter of Example 24 optionally includes wherein operating the processing element in the second mode further comprises: transmitting the read pointer reference with a read pointer to a row multiplexer coupled to the processing element and to a column multiplexer coupled to the processing element.

In Example 26, the subject matter of Example 25 optionally includes wherein the processing element does not receive row data sets or column data sets from a memory device of the processing element.

In Example 27, the subject matter of any one or more of Examples 1-26 optionally include wherein the at least one processor is a processor of a neural network.

In Example 28, the subject matter of any one or more of Examples 1-27 optionally include wherein the processing element is one of a plurality of processing elements.

Example 29 is a method of operating a processing element of a hardware accelerator, the method includes operating in a first mode, wherein operating in the first mode comprises: receiving row data sets and transmitting the row data sets to a multiplier; and receiving column data sets and transmitting the column data sets to the multiplier; and operating in a second mode, wherein operating in the second mode comprises: selecting a row data set to send to the multiplier based on matching a row data set index with a column data set index; and selecting a column data set to send to the multiplier based on matching a column data set index with a row data set index.

In Example 30, the subject matter of Example 29 optionally includes wherein operating in the second mode further comprises: receiving the row data set at a row multiplexer coupled to the processing element.

In Example 31, the subject matter of Example 30 optionally includes wherein, operating in the second mode further comprises: receiving the row data set at the row multiplexer from a row memory device coupled to the row multiplexer and the processing element.

In Example 32, the subject matter of Example 31 optionally includes wherein the row memory device is a first in first out memory device.

In Example 33, the subject matter of any one or more of Examples 31-32 optionally include wherein operating in the second mode further comprises: prior to receiving the row data set at the row multiplexer, receiving the row data set at the row memory device.

In Example 34, the subject matter of Example 33 optionally includes wherein operating in the second mode further comprises: after receiving the row data set at the row memory device, bypassing the row data set through the row memory device.

In Example 35, the subject matter of any one or more of Examples 33-34 optionally include wherein operating in the second mode further comprises: after receiving the row data set at the row memory device, preventing transmission of additional row data sets to the row memory device.

In Example 36, the subject matter of any one or more of Examples 33-35 optionally include wherein operating in the second mode further comprises: after receiving the row data set at the row memory device, storing the row data set in the row memory device.

In Example 37, the subject matter of any one or more of Examples 31-36 optionally include wherein the row multiplexer is one of a first row multiplexer coupled to the processing element or a second row multiplexer coupled to the processing element.

In Example 38, the subject matter of Example 37 optionally includes wherein the row memory device is one of a first row memory device coupled to the first row multiplexer and the processing element or a second row memory device coupled to the second row multiplexer and the processing element.

In Example 39, the subject matter of any one or more of Examples 29-38 optionally include wherein operating in the second mode further comprises: receiving the column data set at a column multiplexer coupled to a processing element.

In Example 40, the subject matter of Example 39 optionally includes wherein operating in the second mode further comprises: receiving the column data set at the column multiplexer from a column memory device coupled to the column multiplexer and the processing element.

In Example 41, the subject matter of Example 40 optionally includes wherein the column memory device is a first in first out memory device.

In Example 42, the subject matter of any one or more of Examples 40-41 optionally include wherein operating in the second mode further comprises: prior to receiving the column data set at the column multiplexer, receiving the column data set at the column memory device.

In Example 43, the subject matter of Example 42 optionally includes wherein operating in the second mode further comprises: after receiving the column data set at the column memory device, bypassing the column data set through the column memory device.

In Example 44, the subject matter of any one or more of Examples 42-43 optionally include wherein operating in the second mode further comprises: after receiving the column data set at the column memory device, preventing transmission of additional column data sets to the column memory device.

In Example 45, the subject matter of any one or more of Examples 42-44 optionally include wherein operating in the second mode further comprises: after receiving the column data set at the column memory device, storing the column data set in the column memory device.

In Example 46, the subject matter of any one or more of Examples 40-45 optionally include wherein the column multiplexer is one of a first column multiplexer coupled to the processing element or a second column multiplexer coupled to the processing element.

In Example 47, the subject matter of Example 46 optionally includes wherein the column memory device is one of a first column memory device coupled to the first column multiplexer and the processing element or a second column memory device coupled to the second column multiplexer and the processing element.

In Example 48, the subject matter of any one or more of Examples 29-47 optionally include wherein operating in the second mode further comprises: comparing a row data set index to a column data set index that does not match; and discarding one of the row data set or column data set based on the comparison of the row data set index to the column data set index.

In Example 49, the subject matter of Example 48 optionally includes wherein operating in the second mode further comprises: storing the row data set in the row memory device or storing the column data set in the column memory device based on the comparison of the row data set index to the column data set index.

In Example 50, the subject matter of any one or more of Examples 29-49 optionally include wherein operating in the second mode further comprises: compressing the row data set prior to selecting to send the row data set to the multiplier.

In Example 51, the subject matter of any one or more of Examples 29-50 optionally include wherein operating in the second mode further comprises: compressing the column data set prior to selecting to send the column data set to the multiplier.

In Example 52, the subject matter of any one or more of Examples 29-51 optionally include wherein while operating in the second mode, selecting the row data set and selecting the column data set are further based on a read pointer reference.

In Example 53, the subject matter of Example 52 optionally includes wherein operating in the second mode further comprises: transmitting the read pointer reference with a read pointer to a row multiplexer coupled to the processing element and to a column multiplexer coupled to the processing element.

In Example 54, the subject matter of Example 53 optionally includes wherein the processing element does not receive row data sets or column data sets from a memory device of the processing element.

In Example 55, the subject matter of any one or more of Examples 29-54 optionally include wherein the processing element is one of a plurality of processing elements.

Example 56 is an apparatus comprising means to perform any of the methods 29-55.

Example 57 is at least one non-transitory machine readable medium including instructions that, when executed by a machine, cause the machine to perform any of the methods 29-55.

Example 58 is at least one non-transitory machine readable medium including instructions for increasing processing speed, the instructions, when executed by a machine, cause the machine to perform operations including operate a processing element in a first mode, wherein operating in the first mode comprises: receiving row data sets and transmitting the row data sets to a multiplier; and receiving column data sets and transmitting the column data sets to the multiplier; and operate the processing element in a second mode, wherein operating in the second mode comprises: selecting a row data set to send to the multiplier based on matching a row data set index with a column data set index; and selecting a column data set to send to the multiplier based on matching a column data set index with a row data set index.

In Example 59, the subject matter of Example 58 optionally includes wherein the processing element in the second mode further operates to: receive the row data set at a row multiplexer coupled to the processing element.

In Example 60, the subject matter of Example 59 optionally includes wherein the processing element in the second mode further operates to: receive the row data set at the row multiplexer from a row memory device coupled to the row multiplexer and the processing element.

In Example 61, the subject matter of Example 60 optionally includes wherein the row memory device is a first in first out memory device.

In Example 62, the subject matter of any one or more of Examples 60-61 optionally include wherein the processing element in the second mode further operates to: prior to receiving the row data set at the row multiplexer, receive the row data set at the row memory device.

In Example 63, the subject matter of Example 62 optionally includes wherein the processing element in the second mode further operates to: after receiving the row data set at the row memory device, bypass the row data set through the row memory device.

In Example 64, the subject matter of any one or more of Examples 62-63 optionally include wherein the processing element in the second mode further operates to: after receiving the row data set at the row memory device, prevent transmission of additional row data sets to the row memory device.

In Example 65, the subject matter of any one or more of Examples 62-64 optionally include wherein the processing element in the second mode further operates to: after receiving the row data set at the row memory device, store the row data set in the row memory device.

In Example 66, the subject matter of any one or more of Examples 60-65 optionally include wherein the row multiplexer is one of a first row multiplexer coupled to the processing element or a second row multiplexer coupled to the processing element.

In Example 67, the subject matter of Example 66 optionally includes wherein the row memory device is one of a first row memory device coupled to the first row multiplexer and the processing element or a second row memory device coupled to the second row multiplexer and the processing element.

In Example 68, the subject matter of any one or more of Examples 58-67 optionally include wherein the processing element in the second mode further operates to: receive the column data set at a column multiplexer coupled to a processing element.

In Example 69, the subject matter of Example 68 optionally includes wherein the processing element in the second mode further operates to: receive the column data set at the column multiplexer from a column memory device coupled to the column multiplexer and the processing element.

In Example 70, the subject matter of Example 69 optionally includes wherein the column memory device is a first in first out memory device.

In Example 71, the subject matter of any one or more of Examples 69-70 optionally include wherein the processing element in the second mode further operates to: prior to receiving the column data set at the column multiplexer, receive the column data set at the column memory device.

In Example 72, the subject matter of Example 71 optionally includes wherein the processing element in the second mode further operates to: after receiving the column data set at the column memory device, bypass the column data set through the column memory device.

In Example 73, the subject matter of any one or more of Examples 71-72 optionally include wherein the processing element in the second mode further operates to: after receiving the column data set at the column memory device, prevent transmission of additional column data sets to the column memory device.

In Example 74, the subject matter of any one or more of Examples 71-73 optionally include wherein the processing element in the second mode further operates to: after receiving the column data set at the column memory device, store the column data set in the column memory device.

In Example 75, the subject matter of any one or more of Examples 69-74 optionally include wherein the column multiplexer is one of a first column multiplexer coupled to the processing element or a second column multiplexer coupled to the processing element.

In Example 76, the subject matter of Example 75 optionally includes wherein the column memory device is one of a first column memory device coupled to the first column multiplexer and the processing element or a second column memory device coupled to the second column multiplexer and the processing element.

In Example 77, the subject matter of any one or more of Examples 58-76 optionally include wherein the processing element in the second mode further operates to: compare a row data set index to a column data set index that does not match; and discard one of the row data set or column data set based on the comparison of the row data set index to the column data set index.

In Example 78, the subject matter of Example 77 optionally includes wherein the processing element in the second mode further operates to: store the row data set in the row memory device or store the column data set in the column memory device based on the comparison of the row data set index to the column data set index.

In Example 79, the subject matter of any one or more of Examples 58-78 optionally include wherein the processing element in the second mode further operates to: compress the row data set prior to selecting to send the row data set to the multiplier.

In Example 80, the subject matter of any one or more of Examples 58-79 optionally include wherein the processing element in the second mode further operates to: compress the column data set prior to selecting to send the column data set to the multiplier.

In Example 81, the subject matter of any one or more of Examples 58-80 optionally include wherein while operating in the second mode, selecting the row data set and selecting the column data set are further based on a read pointer reference.

In Example 82, the subject matter of Example 81 optionally includes wherein the processing element in the second mode further operates to: transmit the read pointer reference with a read pointer to a row multiplexer coupled to the processing element and to a column multiplexer coupled to the processing element.

In Example 83, the subject matter of Example 82 optionally includes wherein the processing element does not receive row data sets or column data sets from a memory device of the processing element.

In Example 84, the subject matter of any one or more of Examples 58-83 optionally include wherein the processing element is one of a plurality of processing elements.

Example 85 is an apparatus for accelerating processing of one or more processors, the apparatus includes means for receiving row data sets and transmitting the row data sets to a multiplier while operating in a first mode; means for receiving column data sets and transmitting the column data sets to the multiplier while operating in the first mode; means for selecting a row data set to send to the multiplier based on matching a row data set index with a column data set index while operating in a second mode; and means for selecting a column data set to send to the multiplier based on matching a column data set index with a row data set index while operating in the second mode.

In Example 86, the subject matter of Example 85 optionally includes Means for receiving the row data set at a row multiplexer coupled to the processing element while operating in the second mode.

In Example 87, the subject matter of Example 86 optionally includes means for receiving the row data set at the row multiplexer from a row memory device coupled to the row multiplexer and the processing element while operating in the second mode.

In Example 88, the subject matter of Example 87 optionally includes wherein the row memory device is a first in first out memory device.

In Example 89, the subject matter of any one or more of Examples 87-88 optionally include prior to receiving the row data set at the row multiplexer, means for receiving the row data set at the row memory device while operating in the second mode.

In Example 90, the subject matter of Example 89 optionally includes after receiving the row data set at the row memory device, means for bypassing the row data set through the row memory device while operating in the second mode.

In Example 91, the subject matter of any one or more of Examples 89-90 optionally include after receiving the row data set at the row memory device, means for preventing transmission of additional row data sets to the row memory device while operating in the second mode.

In Example 92, the subject matter of any one or more of Examples 89-91 optionally include after receiving the row data set at the row memory device, means for storing the row data set in the row memory device while operating in the second mode.

In Example 93, the subject matter of any one or more of Examples 87-92 optionally include wherein the row multiplexer is one of a first row multiplexer coupled to the processing element or a second row multiplexer coupled to the processing element.

In Example 94, the subject matter of Example 93 optionally includes wherein the row memory device is one of a first row memory device coupled to the first row multiplexer and the processing element or a second row memory device coupled to the second row multiplexer and the processing element.

In Example 95, the subject matter of any one or more of Examples 85-94 optionally include means for receiving the column data set at a column multiplexer coupled to a processing element while operating in the second mode.

In Example 96, the subject matter of Example 95 optionally includes means for receiving the column data set at the column multiplexer from a column memory device coupled to the column multiplexer and the processing element while operating in the second mode.

In Example 97, the subject matter of Example 96 optionally includes wherein the column memory device is a first in first out memory device.

In Example 98, the subject matter of any one or more of Examples 96-97 optionally include prior to receiving the column data set at the column multiplexer, means for receiving the column data set at the column memory device while operating in the second mode.

In Example 99, the subject matter of Example 98 optionally includes after receiving the column data set at the column memory device, means for bypassing the column data set through the column memory device while operating in the second mode.

In Example 100, the subject matter of any one or more of Examples 98-99 optionally include after receiving the column data set at the column memory device, means for preventing transmission of additional column data sets to the column memory device while operating in the second mode.

In Example 101, the subject matter of any one or more of Examples 98-100 optionally include after receiving the column data set at the column memory device, means for storing the column data set in the column memory device while operating in the second mode.

In Example 102, the subject matter of any one or more of Examples 96-101 optionally include wherein the column multiplexer is one of a first column multiplexer coupled to the processing element or a second column multiplexer coupled to the processing element.

In Example 103, the subject matter of Example 102 optionally includes wherein the column memory device is one of a first column memory device coupled to the first column multiplexer and the processing element or a second column memory device coupled to the second column multiplexer and the processing element.

In Example 104, the subject matter of any one or more of Examples 85-103 optionally include means for comparing a row data set index to a column data set index that does not match while operating in the second mode; and means for discarding one of the row data set or column data set based on the comparison of the row data set index to the column data set index while operating in the second mode.

In Example 105, the subject matter of Example 104 optionally includes means for storing the row data set in the row memory device or storing the column data set in the column memory device based on the comparison of the row data set index to the column data set index while operating in the second mode.

In Example 106, the subject matter of any one or more of Examples 85-105 optionally include means for compressing the row data set prior to selecting to send the row data set to the multiplier.

In Example 107, the subject matter of any one or more of Examples 85-106 optionally include means for compressing the column data set prior to selecting to send the column data set to the multiplier.

In Example 108, the subject matter of any one or more of Examples 85-107 optionally include means for selecting the row data set and means for selecting the column data set are further based on a read pointer reference while operating in the second mode.

In Example 109, the subject matter of Example 108 optionally includes means for transmitting the read pointer reference with a read pointer to a row multiplexer coupled to the processing element and to a column multiplexer coupled to the processing element while operating in the second mode.

In Example 110, the subject matter of Example 109 optionally includes wherein the processing element does not receive row data sets or column data sets from a memory device of the processing element.

In Example 111, the subject matter of any one or more of Examples 85-110 optionally include wherein the processing element is one of a plurality of processing elements.

In Example 112, the subject matter of any one or more of Examples 85-111 optionally include wherein the at least one processor is a processor of a neural network.

In Example 113, the system comprises means to perform any method of examples 1-112.

In Example 114, at least one machine readable medium includes instructions that, when executed by a machine, cause the machine to perform of Examples 1-112.

In Example 115 is a system to implement of any of Examples 1-112.

In Example 116 is a method to implement of any Examples 1-112.

Each of these non-limiting examples may stand on its own, or may be combined in various permutations or combinations with one or more of the other examples.

The above detailed description includes references to the accompanying drawings, which form a part of the detailed description. The drawings show, by way of illustration, specific embodiments in which the invention may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments may be combined with each other in various combinations or permutations. The scope of the invention should be determined with reference to the appended claims, along with the full scope of equivalents to which such claims are entitled.

What is claimed:

1. An apparatus for accelerating processing of one or more processors, the apparatus comprising:
    at least one processing element having a multiplier that receives row data sets and column data sets while operating in a first mode;
    at least one row multiplexer and at least one row memory device coupled to the at least one processing element for selecting a row data set received by the multiplier based on matching a row data set index with a column data set index while operating in a second mode; and
    at least one column multiplexer and at least one column memory device coupled to the at least one processing element for selecting a column data set received by the multiplier based on matching a column data set index with a row data set index while operating in the second mode.

2. The apparatus of claim 1, wherein the at least one row memory device receives the row data set, and after receiving the row data set, the at least one row memory device bypasses the row data set through the at least one row memory device while operating in the second mode.

3. The apparatus of claim 1, wherein the at least one processing element receives the row data set, and after receiving the row data set, the at least one processing element prevents transmission of additional row data sets to the at least one row memory device while operating in the second mode.

4. The apparatus of claim 1, wherein the at least one row memory device receives the row data set, and after receiving the row data set, the at least one row memory device stores the row data set in the at least one row memory device while operating in the second mode.

5. The apparatus of claim 1, wherein the at least one row multiplexer comprises a first row multiplexer coupled to the at least one processing element and a second row multiplexer coupled to the at least one processing element.

6. The apparatus of claim 5, wherein the at least one row memory device comprises a first row memory device coupled to the first row multiplexer and the at least one processing element, and a second row memory device coupled to the second row multiplexer and the at least one processing element.

7. The apparatus of claim 6, wherein the at least one column multiplexer comprises a first column multiplexer coupled to the at least one processing element, and a second column multiplexer coupled to the at least one processing element.

8. The apparatus of claim 7, wherein the at least one column memory device comprises a first column memory device coupled to the first column multiplexer and the at least one processing element, and a second column memory device coupled to the second column multiplexer and the at least one processing element.

9. The apparatus of claim 1, wherein prior to the multiplier receiving the selected row data set and selected column data set, the at least one processing element compares the row data set index of the selected row data set to the column data set index of the selected column data set while operating in the second mode.

10. The apparatus of claim 9, wherein when the compared row data set index and column data set index do not match, the at least one processing element discards one of the selected row data set or selected column data set while operating in the second mode.

11. The apparatus of claim 10, wherein the at least one processing element discards one of the selected row data set or selected column data set based on the row data set index or the column data set index.

12. The apparatus of claim 1, wherein the at least one processing element is one of a plurality of processing elements.

13. The apparatus of claim 1, wherein the at least one processor is a processor of a neural network.

14. The apparatus of claim 1 wherein the at least one processing element has an accumulator that is coupled to the multiplier.

15. The apparatus of claim 1 wherein the at least one row memory device is a first in and first out memory device.

16. At least one non-transitory machine readable medium including instructions for increasing processing speed, the instructions, when executed by a machine, cause the machine to perform operations comprising:
  operate a processing element in a first mode, wherein operating in the first mode comprises:
    receiving row data sets and transmitting the row data sets to a multiplier of the processing element; and
    receiving column data sets and transmitting the column data sets to the multiplier; and
  operate the processing element in a second mode, wherein operating in the second mode comprises:
    using at least one row multiplexer and at least one row memory coupled to the processing element to select a row data set received by the multiplier based on matching a row data set index with a column data set index; and
    using at least one row multiplexer and at least one row memory coupled to the processing element to select a column data set received by the multiplier based on matching a column data set index with a row data set index.

17. The at least one non-transitory machine readable medium of claim 16, wherein the processing element in the second mode further operates to:
  receive the row data set at a row memory device coupled to the processing element; and
  bypass the row data set through the row memory device.

18. The at least one non-transitory machine readable medium of claim 16, wherein the processing element in the second mode further operates to:
  receive the row data set at a row memory device coupled to the processing element; and
  prevent transmission of additional row data sets to the row memory device.

19. The at least one non-transitory machine readable medium of claim 16, wherein the processing element in the second mode further operates to:
  receive the row data set at a row memory device coupled to the processing element; and
  store the row data set in the row memory device.

20. The at least one non-transitory machine readable medium of claim 16, wherein the processing element in the second mode further operates to:
  compare a row data set index to a column data set index that does not match; and
  store the row data set in a row memory device coupled to the processing element or store the column data set in a column memory device coupled to the processing element based on the comparison of the row data set index to the column data set index.

21. The at least one non-transitory machine readable medium of claim 16, wherein while operating in the second mode, selecting the row data set and selecting the column data set are further based on a read pointer reference.

22. The at least one non-transitory machine readable medium of claim 16, wherein the processing element is one of a plurality of processing elements operated by the non-transitory, machine readable medium.

23. A method of operating a processing element of a hardware accelerator, the method comprising:
  operating a processing element of an apparatus in a first mode, wherein operating in the first mode comprises:
    receiving row data sets and transmitting the row data sets to a multiplier of the processing element; and
    receiving column data sets and transmitting the column data sets to the multiplier; and
  operating in a second mode, wherein operating in the second triode comprises:

using at least one row multiplexer and at least one row memory, of the apparatus, coupled to the processing element to select a row data set received by the multiplier based on matching a row data set index with a column data set index; and using at least one row multiplexer and at least one row memory coupled to the processing element to select a column data set to received by the multiplier based on matching a column data set index with a row data set index.

24. The method of claim 23, wherein operating in the second mode further comprises:

receiving the row data set, at a row memory device coupled to the processing element; and bypassing the row data set through the row memory device.

25. The method of claim 23, wherein operating in the second mode further comprises:

receiving the row data set at a row memory device coupled to the processing element; and preventing transmission of additional row data sets to the row memory device.

* * * * *

UNITED STATES PATENT AND TRADEMARK OFFICE
CERTIFICATE OF CORRECTION

PATENT NO. : 10,509,846 B2
APPLICATION NO. : 15/840552
DATED : December 17, 2019
INVENTOR(S) : Koren et al.

It is certified that error appears in the above-identified patent and that said Letters Patent is hereby corrected as shown below:

In the Claims

In Column 28, Line 56-57, in Claim 22, delete "non-transitory," and insert --non-transitory-- therefor In Column 28, Line 67, in Claim 23, delete "triode" and insert --mode-- therefor In Column 29, Line 13, in Claim 24, delete "set," and insert --set-- therefor Signed and Sealed this
Twenty-eighth Day of July, 2020

Andrei Iancu
*Director of the United States Patent and Trademark Office*